United States Patent
Nadel et al.

(10) Patent No.: US 11,939,045 B2
(45) Date of Patent: Mar. 26, 2024

(54) LANDING GEAR ASSEMBLY FOR AN AIRCRAFT, A LANDING GEAR SYSTEM, AND A METHOD

(71) Applicant: The Boeing Company, Chicago, IL (US)

(72) Inventors: Adam Ian Nadel, Vienna, VA (US); Andrew Leung, Philadelphia, PA (US); Alex Schonfeld, Wallingford, PA (US); Anthony R. Amadio, Broomall, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/660,942

(22) Filed: Apr. 27, 2022

(65) Prior Publication Data
US 2023/0348047 A1    Nov. 2, 2023

(51) Int. Cl.
*B64C 25/30* (2006.01)
*B64C 25/14* (2006.01)
*B64C 25/60* (2006.01)

(52) U.S. Cl.
CPC ............. *B64C 25/30* (2013.01); *B64C 25/14* (2013.01); *B64C 25/60* (2013.01)

(58) Field of Classification Search
CPC ......... B64C 25/10; B64C 25/12; B64C 25/14; B64C 25/18; B64C 25/26; B64C 25/28; B64C 25/30; B64C 25/58; B64C 25/60; B64C 25/62; B64C 25/64; B64C 2025/125

See application file for complete search history.

(56) References Cited

U.S. PATENT DOCUMENTS

| | | | |
|---|---|---|---|
| 2,930,609 A | 3/1960 | Orloff | |
| 4,537,374 A | 8/1985 | Barnoin et al. | |
| 4,558,837 A | 12/1985 | Mens et al. | |
| 5,330,132 A | 7/1994 | Lucienne et al. | |
| 5,337,976 A | 8/1994 | Derrien | |
| 7,575,193 B2 | 8/2009 | Payen et al. | |
| 9,033,275 B2 | 5/2015 | Barbieri et al. | |
| 2008/0237396 A1 | 10/2008 | Bietenhader | |
| 2009/0095839 A1* | 4/2009 | Lassus | F15B 15/204 244/102 R |
| 2010/0288878 A1* | 11/2010 | Bennett | B64C 25/34 702/50 |
| 2018/0222575 A1* | 8/2018 | Cepic | B64D 45/00 |

* cited by examiner

*Primary Examiner* — Joshua J Michener
*Assistant Examiner* — Colin Zohoori
(74) *Attorney, Agent, or Firm* — Quinn IP Law

(57) ABSTRACT

A landing gear assembly for an aircraft includes an energy absorber and a land-contact assembly attached to the energy absorber. A retraction assembly is attached to the energy absorber via a pivot point. A trigger assembly is coupled to the energy absorber and the retraction assembly. The trigger assembly is configured to retract the land-contact assembly from an extended position to retracted position in response to a piston of the energy absorber reaching a maximum stroke position in which the trigger assembly triggers an actuator to actuate from a locked position to an unlocked position to release the retraction assembly in a controlled manner which rotates the energy absorber and the land-contact assembly to the retracted position. The maximum stroke position of the piston is beyond normal-operation stroke positions of the piston. A landing gear system and a method of activating the landing gear system utilizes the trigger assembly.

20 Claims, 13 Drawing Sheets

LANDING GEAR ASSEMBLY FOR AN AIRCRAFT, A LANDING GEAR SYSTEM, AND A METHOD

STATEMENT REGARDING FEDERALLY SPONSORED RESEARCH OR DEVELOPMENT

This invention was made with Government support under W9124P-19-9-0001 awarded by the Department of Defense. The Government has certain rights in this invention.

BACKGROUND

Conventional landing gear has a landing gear leg attached to a fuselage of an aircraft. The landing gear has wheels or skids that contact the ground when the aircraft is landing. The landing gear may be retractable into the fuselage during flight for aerodynamic purposes of the aircraft. During landing of the aircraft, the landing gear is extended out for landing purposes. However, if an excess force is applied to the landing gear during landing, the landing gear may buckle in an undesired manner.

SUMMARY

It is desirable to develop landing gear that retracts in a controlled manner when a threshold is reached during landing.

The present disclosure pertains to a landing gear assembly for an aircraft. The landing gear assembly includes an energy absorber and a land-contact assembly attached to the energy absorber. The energy absorber includes a housing and a piston movable within the housing along a first axis in a plurality of normal-operation stroke positions. The energy absorber and the land-contact assembly are movable together from an extended position to a retracted position. The landing gear assembly also includes a retraction assembly attached to the energy absorber via a pivot point. The retraction assembly includes an actuator movable to a locked position which locks the energy absorber and the land-contact assembly in the extended position. The actuator is movable to an unlocked position which releases the retraction assembly and rotates the energy absorber and the land-contact assembly relative to the pivot point to the retracted position. The landing gear assembly further includes a trigger assembly coupled to the energy absorber and the retraction assembly. The trigger assembly is configured to retract the land-contact assembly from the extended position to the retracted position in response to the piston of the energy absorber reaching a maximum stroke position in which the trigger assembly triggers the actuator to actuate from the locked position to the unlocked position to release the retraction assembly in a controlled manner which rotates the energy absorber and the land-contact assembly relative to the pivot point to the retracted position. The maximum stroke position of the piston is beyond the normal-operation stroke positions of the piston.

The present disclosure also pertains to a landing gear system for an aircraft including a fuselage. The landing gear system includes a landing gear assembly coupled to the fuselage. The landing gear assembly includes an energy absorber and a land-contact assembly attached to the energy absorber. The energy absorber includes a housing and a piston movable within the housing along a first axis in a plurality of normal-operation stroke positions. The energy absorber and the land-contact assembly are movable together from an extended position to a retracted position. The landing gear assembly also includes a retraction assembly attached to the energy absorber via a pivot point and fixed to the fuselage. The retraction assembly includes an actuator movable to a locked position which locks the energy absorber and the land-contact assembly in the extended position and the actuator is movable to an unlocked position which releases the retraction assembly and rotates the energy absorber and the land-contact assembly relative to the pivot point to the retracted position. The landing gear assembly further includes a trigger assembly coupled to the energy absorber and the retraction assembly. The trigger assembly is configured to retract the land-contact assembly from the extended position to the retracted position in response to the piston of the energy absorber reaching a maximum stroke position in which the trigger assembly triggers the actuator to actuate from the locked position to the unlocked position to release the retraction assembly in a controlled manner which rotates the energy absorber and the land-contact assembly relative to the pivot point to the retracted position. The maximum stroke position of the piston is beyond the normal-operation stroke positions of the piston.

Additionally, the present disclosure pertains to a method of activating a landing gear system of an aircraft. A land-contact assembly is positioned in an extended position. A position of a piston of an energy absorber is detected within a housing of the energy absorber. The piston is movable along a first axis in a plurality of normal-operation stroke positions. The land-contact assembly is attached to the energy absorber. An actuator of a retraction assembly is actuated to a locked position which locks the energy absorber and the land-contact assembly in the extended position. The retraction assembly is attached to the energy absorber via a pivot point. A trigger assembly is activated in response to the piston of the energy absorber reaching a maximum stroke position to trigger the actuator to actuate from the locked position to an unlocked position to release the retraction assembly in a controlled manner which rotates the energy absorber and the land-contact assembly relative to the pivot point to a retracted position. The maximum stroke position of the piston is beyond the normal-operation stroke positions of the piston. The trigger assembly is coupled to the energy absorber and the retraction assembly.

The detailed description and the drawings or figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
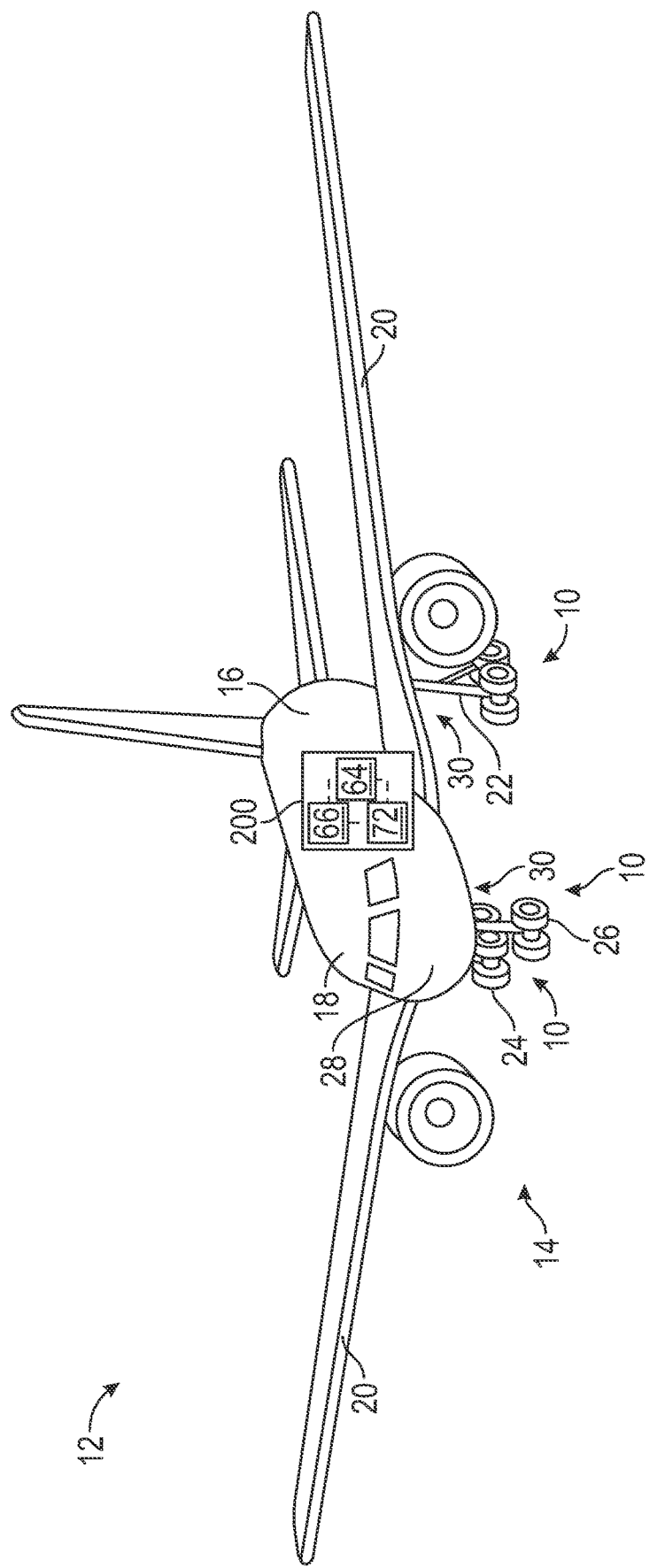
FIG. 1 is a schematic perspective view of an aircraft including a landing gear assembly and a landing gear system.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. In addition, any threshold referred to herein may be any suitable value based on engineering requirements, government requirements, etc.

When referring to a component being along an axis or moving along an axis, this may include one or more of coaxial, substantially parallel, offset or spaced from, that axis. When referring to a component being transverse to an axis or moving transverse to an axis, this may include one or more of angled, perpendicular, offset or spaced from, that axis.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components. Therefore, the phrase "and/or" as used herein should be construed to include the options of A and B, A or B, and so on depending on the number of components.

Referring to the figures, wherein like numerals indicate like or corresponding parts throughout the several views, a landing gear assembly 10 for an aircraft 12 and a landing gear system 14 for the aircraft 12 are generally shown in FIG. 1. The landing gear system 14 may include the landing gear assembly 10 as well as other components, some of which are discussed herein. As discussed in detail below, the landing gear assembly 10 provides a way to retract in a controlled manner when a threshold is reached during landing of the aircraft 12. For example, following a high energy vertical descent of the aircraft 12 relative to the ground 15, if the landing energy exceeds a load capacity of the landing gear when contacting the ground 15, the landing gear assembly 10 provides a way to retract the landing gear in the controlled manner and into a predetermined location. It is to be appreciated that the landing gear assembly 10, the landing gear system 14, and methods 200 herein may be used with other movable platforms, such as manned aircrafts 12, unmanned aircrafts 12, spaceships, etc.

Continuing with FIG. 1, the aircraft 12 may include a fuselage 16, a cockpit 18, and a plurality of wings 20 (depending on the type of aircraft 12) attached to the fuselage 16, as well as other components not specifically described herein. The fuselage 16 may include a cabin having a plurality of seats for passengers and crew members. Generally, the landing gear assembly 10 is coupled to the fuselage 16. The landing gear assembly 10 may be indirectly or directly coupled to the fuselage 16. More specifically, the landing gear assembly 10 is fixed to the fuselage 16 such that the landing gear assembly 10 may support the aircraft 12 during landing, taxiing, takeoff, or any other movement across the ground 15, as well as support the aircraft 12 when stationary. The landing gear assembly 10 may include one or more trunnion(s), non-vertical force member(s), side brace(s), link(s), drag link(s), lateral link(s), linkage(s), aircraft attachment(s), fitting(s), etc., fixed to the fuselage 16 to also support the landing gear.

Depending on the type of aircraft 12, the aircraft 12 may include a left main landing gear 22 (LMLG), a right main landing gear 24 (RMLG), and a front wheel or front land-contact component 26 near a nose 28 of the fuselage 16. The LMLG 22 may be coupled to the bottom of one of the wings 20 at or near the root of this corresponding wing 20 where the wing 20 is attached to the fuselage 16. Similarly, the RMLG 24 is coupled to the bottom of another one of the wings 20 at or near the root of this corresponding wing 20 where the wing 20 is attached to the fuselage 16. The front wheel 26 is coupled to the bottom of the fuselage 16 near the nose 28. The LMLG 22, the RMLG 24 and the front wheel 26 may be retractable, and thus, may be configured to utilize the landing gear assembly 10 described herein. The below discussion refers to one landing gear assembly 10, but it is to be appreciated that at least one of the LMLG 22, the RMLG 24, and the front wheel 26 may include a respective landing gear assembly 10 described herein. In other words, the LMLG 22, the RMLG 24, and/or the front wheel 26 may include a respective one of the landing gear assembly 10. For example, the LMLG 22 may include one landing gear assembly 10, the RMLG 24 may include another landing gear assembly 10, the front wheel 26 may include yet another landing gear assembly 10, and combinations thereof.

The aircraft 12 may take-off and land on a runway, a landing pad, or any suitable ground 15. Optionally, the landing gear assembly 10 may be movable relative to the fuselage 16 between a retracted position (see FIG. 3) and an extended position (see FIG. 2). During landing and take-off, the landing gear assembly 10 is in the extended position to facilitate movement of the aircraft 12 on the ground 15. Therefore, the extended position may also be referred to as a deployed position. When the aircraft 12 is in flight, if the landing gear assembly 10 is retractable during flight, the landing gear assembly 10 may move to the retracted position to minimize drag and provide aerodynamic benefits, etc. Otherwise, if the landing gear assembly 10 is not retractable during flight, the landing gear assembly 10 discussed herein will be retractable to the retracted position when certain conditions and/or thresholds are met.

Generally, the fuselage 16 may present a pocket 30 to receive the landing gear assembly 10 in the retracted position. The pocket 30 may be external of the fuselage 16, internal of the fuselage 16, or a combination thereof. The fuselage 16 may optionally include a wheel well or a landing gear bay that at least partially defines the pocket 30 in certain configurations. In other configurations, the pocket 30 may be a space outside of the aircraft 12.

Figure 2:
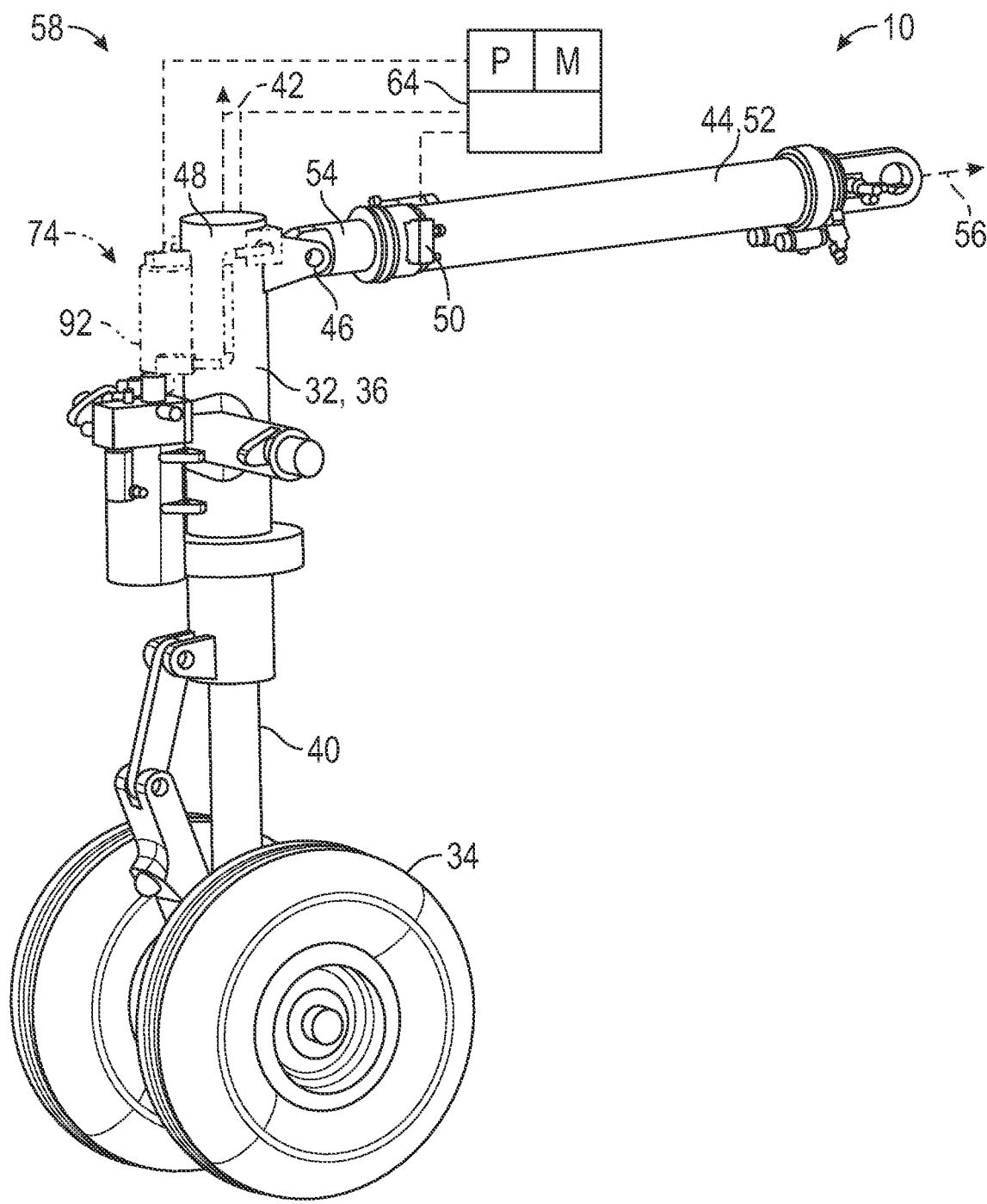
FIG. 2 is a schematic perspective view the landing gear assembly that is compatible with the aircraft of FIG. 1, with a land-contact assembly in an extended position.
Figure 3:
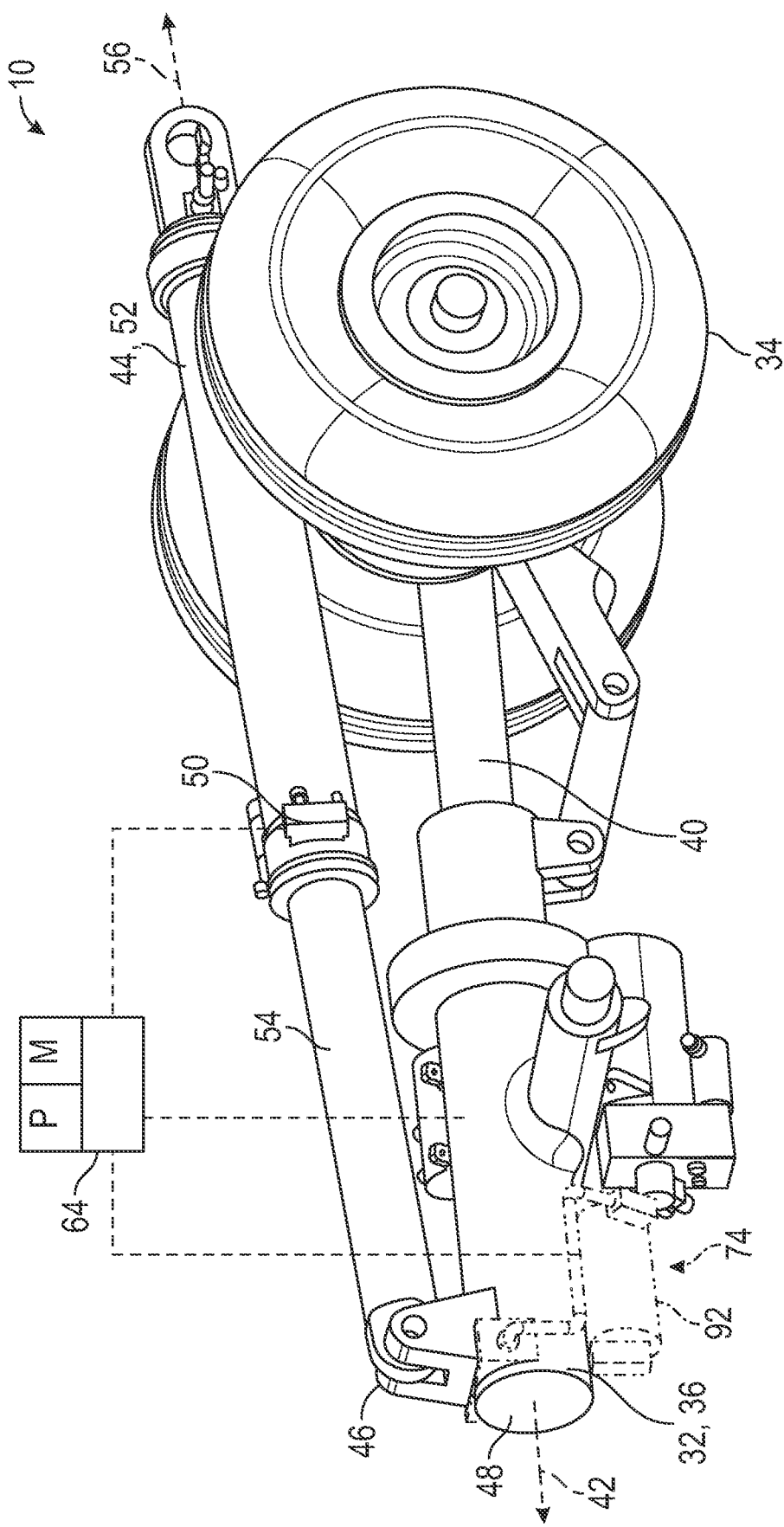
FIG. 3 is a schematic perspective view of the land-contact assembly of FIG. 2 in a retracted position.

Turning to FIGS. 2 and 3, the landing gear assembly 10 includes an energy absorber 32 and a land-contact assembly 34 attached to the energy absorber 32. The land-contact assembly 34 may include one or more wheels, tires, skids, skis, runner, etc., that contact the ground 15 during landing, taxiing, etc. For illustrative purposes only, the figures illustrate wheels, but again may be replaced with any suitable land-contacting component(s). One or more of the trunnion(s), the non-vertical force member(s), the side brace(s), the link(s), the drag link(s), the lateral link(s), the linkage(s), the aircraft attachment(s), the fitting(s), etc., may be fixed to the fuselage 16 and coupled to the land-contact assembly 34 to support the land-contact assembly 34 and assist in, or allow, movement of the land-contact assembly 34 to the retracted position, and back to the extended position in certain configurations.

Generally, the energy absorber 32 is disposed between the land-contact assembly 34 and the fuselage 16. Therefore, the energy absorber 32 is coupled to the fuselage 16, and in certain configurations, may be coupled to the fuselage 16 via the aircraft attachment and/or the trunnion. The energy absorber 32 absorbs energy during landing and movement along the ground 15. Displacement of the energy absorber 32 may be related to a magnitude of a load and/or a rate of load application. For example, a load applied slowly to the energy absorber 32 may result in a small displacement of the energy absorber 32 as compared to a load applied rapidly to the energy absorber 32 which may result in a large displacement of the energy absorber 32.

The energy absorber 32 is disposed between the land-contact assembly 34 and the fuselage 16 to reduce disturbances felt in the fuselage 16 during landing, etc. More specifically, the energy absorber 32 may attenuate vertical deceleration of the aircraft 12 during landing which reduces peak load to the aircraft 12 due to vertical displacement of the energy absorber 32. Generally, vertical deceleration of the aircraft 12 is relative to the ground 15. The energy absorber 32 may be any suitable configuration to absorb energy, and non-limiting examples may include one or more of a shock absorber, a damper, a strut, a non-linear energy absorption device, etc.

Continuing with FIGS. 2 and 3, the energy absorber 32 and the land-contact assembly 34 are movable together from the extended position to the retracted position, which may occur when certain conditions and/or thresholds are met, as discussed further below. In certain configurations, the land-contact assembly 34 is retractable into the pocket 30 of the fuselage 16 after take-off of the aircraft 12 and remains retracted until landing is desired. Furthermore, the land-contact assembly 34 is in the extended position during take-off and taxiing, i.e., disposed outside of the pocket 30. In other configurations, the land-contact assembly 34 remains in the extended position after take-off of the aircraft 12 and during flight, and retracts when the conditions and/or thresholds are met, as discussed further below.

Referring to FIGS. 5-11, the energy absorber 32 includes a housing 36 and a piston 38 movable within the housing 36. The housing 36 of the energy absorber 32 may be filled with a fluid, such as a liquid or a gas, etc.

Figure 7:
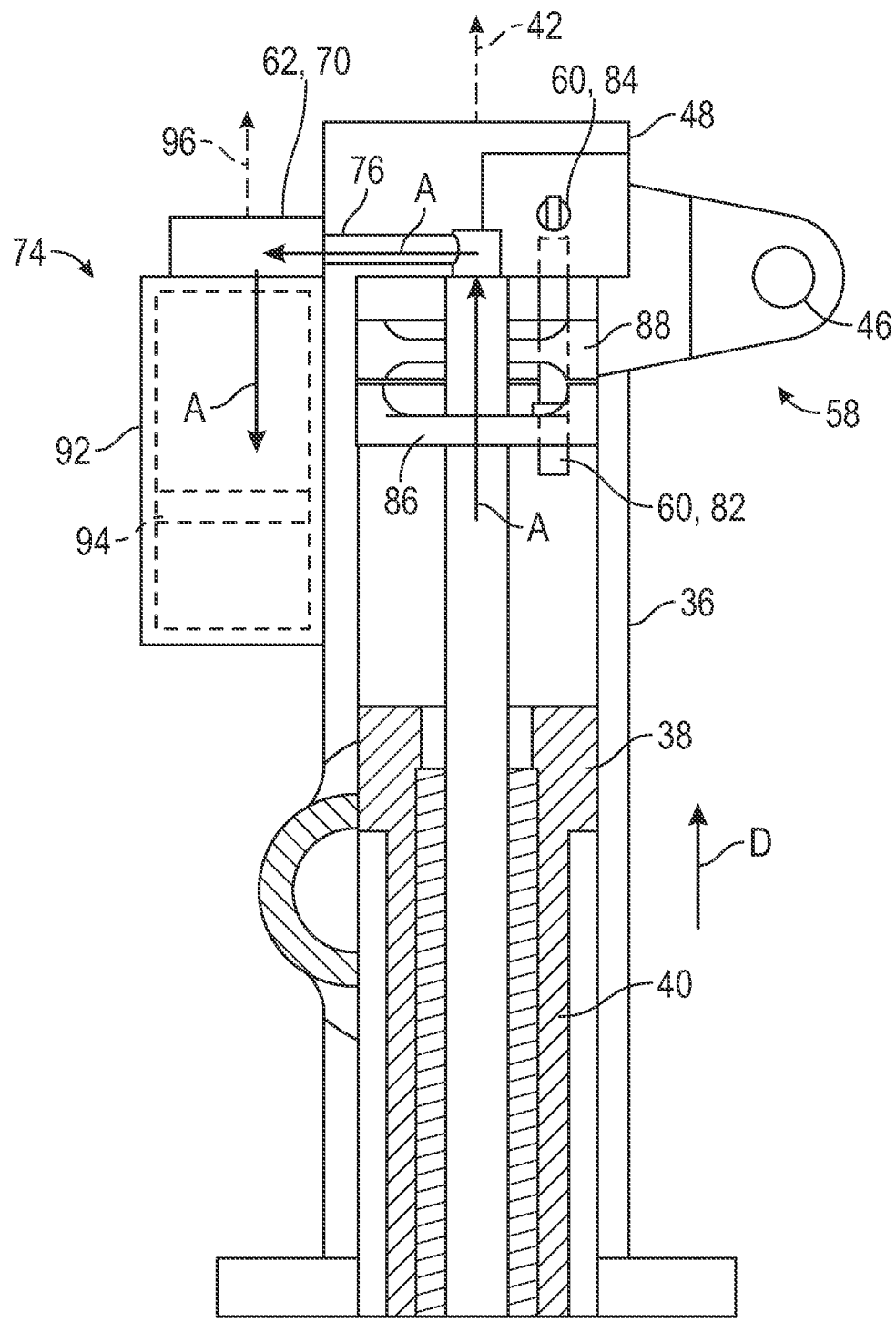
FIG. 7 is a schematic illustration of the piston of FIG. 6 in another normal-operation stroke position, and the switch of FIG. 6 in the initial position.
Figure 11:
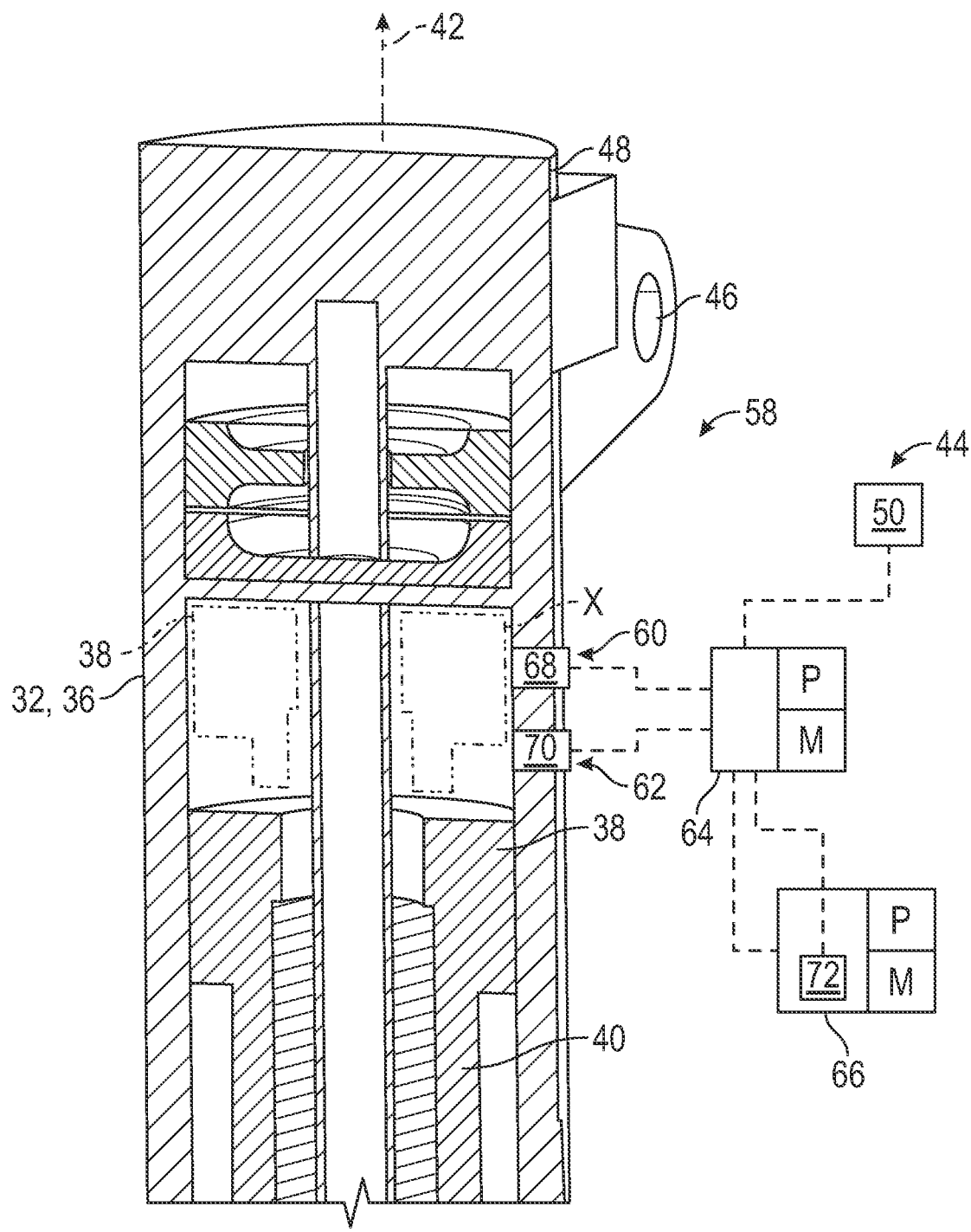
FIG. 11 is a schematic illustration of another configuration of the trigger assembly.

As best shown in FIGS. 7 and 11, the energy absorber 32 may include a rod 40 coupled to the land-contact assembly 34. In certain configurations, the rod 40 is attached to the land-contact assembly 34 and the piston 38 is fixed to the rod 40 opposite the land-contact assembly 34. In certain configurations, the piston 38 is attached to an end of the rod 40. The rod 40 is movable inside of the housing 36 of the energy absorber 32. Therefore, the rod 40 and the piston 38 may be movable in unison or concurrently with each other relative to the housing 36 of the energy absorber 32.

The piston 38 is movable within the housing 36 along a first axis 42 in a plurality of normal-operation stroke positions. Furthermore, the rod 40 may be movable along the first axis 42. Therefore, the rod 40 and the piston 38 of the energy absorber 32 may be movable together along the first axis 42 relative to the housing 36. Vertical displacement of the energy absorber 32, and more specifically, the piston 38 and the rod 40 may be along the first axis 42, and thus the energy absorber 32 operates to absorb energy via displacement along the first axis 42.

Generally, the normal-operation stroke positions are any stroke position of the piston 38 that is below a threshold, and example normal-operation stroke positions may be represented via FIGS. 5-7, 9 and 11. In other words, the normal-operation stroke positions are any stroke position that does not fully compress the energy absorber 32, i.e., does not bottom out the energy absorber 32. Therefore, during landing of the aircraft 12, when a force from the land-contact assembly 34 contacting the ground 15 remains below the threshold, then the energy absorber 32 will operate in the normal-operation stroke positions to absorb energy. For example, movement of the piston 38 of the energy absorber 32 along the first axis 42 may attenuate the vertical deceleration of the aircraft 12 during landing which reduces the peak load to the aircraft 12, and more specifically, reduces peak load to the fuselage 16.

When the force from the land-contact assembly 34 reaches the threshold, the piston 38 of the energy absorber 32 reaches a maximum stroke position (see FIGS. 8 and 10, and dash-dot-dot-dash line X in FIG. 11) within the housing 36. The maximum stroke position may be when the energy absorber 32 fully compresses, i.e., the energy absorber 32 bottom outs. This situation may occur following a high energy vertical descent of the aircraft 12 relative to the ground 15, where the landing energy exceeds the load capacity of the energy absorber 32/the land-contact assembly 34 when contacting the ground 15.

Referring to FIGS. 2 and 3, the landing gear assembly 10 includes a retraction assembly 44 configured to provide controlled retraction of the land-contact assembly 34, and in some configurations, the retraction assembly 44 is configured to provide controlled deployment of the land-contact assembly 34. The energy absorber 32 is disposed between the land-contact assembly 34 and the retraction assembly 44. The non-vertical force member, the drag link, and/or the lateral link may be coupled to the land-contact assembly 34, and when the retraction assembly 44 is activated, the non-vertical force member, the drag link, and/or the lateral link may move in a controlled manner to assist in retracting the land-contact assembly 34.

In certain configurations, the retraction assembly 44 is attached to the energy absorber 32 via a pivot point 46 (as best shown in FIGS. 2 and 3). Furthermore, the retraction assembly 44 may be fixed to the fuselage 16. Therefore, one end of the retraction assembly 44 is fixed to the fuselage 16, and the other end of the retraction assembly 44 is attached to the energy absorber 32. In certain configurations, the energy absorber 32 may include a distal end 48 spaced from the land-contact assembly 34, and the pivot point 46 is disposed along the distal end 48 of the energy absorber 32, with the retraction assembly 44 attached to the pivot point 46. The pivot point 46 may be fixed to the housing 36 of the energy absorber 32, and in certain configurations, fixed to the distal end 48 of the housing 36.

The land-contact assembly 34 may be movable relative to the retraction assembly 44 via the pivot point 46. More specifically, the land-contact assembly 34 may be movable relative to the retraction assembly 44 via the energy absorber 32 due to the energy absorber 32 being between the land-contact assembly 34 and the retraction assembly 44. For example, if the land-contact assembly 34 is in the extended position, to move the land-contact assembly 34 to the retracted position, activation of the retraction assembly 44 causes the energy absorber 32 and the land-contact assembly 34 to rotate relative to the pivot point 46 in a first direction into the pocket 30 of the fuselage 16. As another example, if the land-contact assembly 34 is in the retracted position, to move the land-contact assembly 34 to the extended position, activation of the retraction assembly 44 causes the energy absorber 32 and the land-contact assembly 34 to rotate relative to the pivot point 46 in a second direction opposite the first direction such that the land-contact assembly 34 is then deployed to the extended position. Again, having the land-contact assembly 34 movable from the retracted position back to the extended position is an optional feature, and instead, the land-contact assembly 34 may remain in the extended position at all times except when certain conditions and/or thresholds are met as discussed further below.

Referring to FIGS. 2 and 3, the retraction assembly 44 includes an actuator 50 to move the land-contact assembly 34 to the retracted position and the extended position. Specifically, the actuator 50 is movable to a locked position (FIG. 2) which locks the energy absorber 32 and the land-contact assembly 34 in the extended position. That is, when the actuator 50 is in the locked position, the retraction assembly 44 is secured in a first position (see FIG. 2) which maintains the energy absorber 32 and the land-contact assembly 34 in the extended position. The aircraft 12 may land when the land-contact assembly 34 is in the extended position with the actuator 50 in the locked position.

Referring to FIG. 3, the actuator 50 is movable to an unlocked position which releases the retraction assembly 44 and rotates the energy absorber 32 and the land-contact assembly 34 relative to the pivot point 46 to the retracted position. That is, when the actuator 50 is in the unlocked position, the retraction assembly 44 is released and movable to a second position (see FIG. 3) which releases the energy absorber 32 and the land-contact assembly 34 to move to the retracted position. Said differently, when the actuator 50 is in the unlocked position, the actuator 50 is actuated or activated to rotate the energy absorber 32 and the land-contact assembly 34 relative to the pivot point 46 in the second direction such that the land-contact assembly 34 retracts to the retracted position. In certain configurations, the actuator 50 may be actuated or activated to move the land-contact assembly 34 from the retracted position back to the extended position, in which case, the actuator 50 moves from the unlocked position back to the locked position when the land-contact assembly 34 returns to the extended position. The actuator 50 may be any suitable configuration to lock and unlock, as well as cause movement of the land-contact assembly 34, and for example, the actuator 50 may include a solenoid, a motor, a hydraulic locking mechanism, a pneumatic locking mechanism, etc. It is to be appreciated that the actuator 50 may be mechanical, electrical, electro-mechanical, hydraulic, electro-hydraulic, pneumatic or any other suitable device.

Referring to FIGS. 2 and 3, the retraction assembly 44 may include a housing 52 coupled to the fuselage 16 and the energy absorber 32. Generally, the retraction assembly 44 may be disposed between the fuselage 16 and the energy absorber 32. In certain configurations, the housing 52 of the retraction assembly 44 is fixed to the fuselage 16. The retraction assembly 44 may also include a rod 54 having one end of the rod 54 of the retraction assembly 44 attached to the fuselage 16 or the energy absorber 32. In certain configurations, the end of the rod 54 of the retraction assembly 44 is attached to the energy absorber 32, and in one configuration, the end of the rod 54 is attached to the pivot point 46 of the energy absorber 32. More specifically, in certain configurations, the end of the rod 54 of the retraction assembly 44 is attached to the distal end 48 of the energy absorber 32 at the pivot point 46.

The rod 54 is movable relative to the housing 52 of the retraction assembly 44 along a second axis 56, and the retraction assembly 44 may include a piston fixed to the rod 54. At least part of the rod 54 of the retraction assembly 44 is movable inside of the housing 52, and the piston of the retraction assembly 44 may be movable inside of the housing 52 of the retraction assembly 44. Therefore, the rod 54 and the piston of the retraction assembly 44 are movable together along the second axis 56 relative to the housing 52. In other words, the rod 54 and the piston are movable in unison or concurrently with each other relative to the housing 52 of the retraction assembly 44. The rod 54, the piston, the housing 52, and the actuator 50 may cooperate with each other to provide controlled movement of the land-contact assembly 34. The housing 52 of the retraction assembly 44 may be filled with a fluid, such as a liquid or a gas, etc.

Generally, the energy absorber 32 and the retraction assembly 44 are disposed transverse to each other when the land-contact assembly 34 is in the extended position. Therefore, for example, the first axis 42 and the second axis 56 are transverse to each other when the land-contact assembly 34 is in the extended position (see FIG. 2). It is to be appreciated that the retraction assembly 44 may also be coupled or attached to the drag link or any other suitable supports, braces, links, frames, members, structures, etc. For example, activation of the retraction assembly 44 may allow the non-vertical force member, the drag link, and/or the link, such as a lateral link, to move to retract the land-contact assembly 34 in the controlled manner.

Turning back to the actuator 50, the actuator 50 may be attached to the housing 52 of the retraction assembly 44, and the actuator 50 engages the rod 54 of the retraction assembly 44 in the locked position to prevent movement of the rod 54, and thus, lock the land-contact assembly 34 in the extended position. The actuator 50 may indirectly or directly engage the rod 54 of the retraction assembly 44 when in the locked position. The actuator 50 disengages the rod 54 of the retraction assembly 44 in the unlocked position to allow movement of the rod 54, and thus, unlock the land-contact assembly 34 to retract to the retracted position.

Turning to FIGS. 5-11, the landing gear assembly 10 also includes a trigger assembly 58 coupled to the energy absorber 32 and the retraction assembly 44. Generally, the trigger assembly 58 ultimately triggers the retraction assembly 44 to move the land-contact assembly 34 to the retracted position in certain situations. More specifically, the trigger assembly 58 is configured to retract the land-contact assembly 34 from the extended position to the retracted position in response to the piston 38 of the energy absorber 32 reaching the maximum stroke position in which the trigger assembly 58 triggers the actuator 50 to actuate from the locked position to the unlocked position to release the retraction assembly 44 in the controlled manner which rotates the energy absorber 32 and the land-contact assembly 34 relative to the pivot point 46 to the retracted position. Therefore, optionally, the land-contact assembly 34 may remain in the extended position at all times until certain conditions and/or thresholds are met via the trigger assembly 58 which then causes the land-contact assembly 34 to retract to the retracted position. In certain configurations, additional data may be collected and/or utilized to determine whether to activate the trigger assembly 58, which will be discussed further below.

The controlled manner being referred to is generally when the retraction assembly 44 operates normally to retract the land-contact assembly 34. In other words, the rod 54/the piston of the retraction assembly 44 move normally to retract the land-contact assembly 34 to provide the controlled manner of retraction. Also, optionally, the non-vertical force member, the drag link, and/or the link, such as the lateral link, move normally to retract the land-contact assembly 34 in the controlled manner. Thus, the land-contact assembly 34 retracts in a desired manner and into the predetermined location, such as retracting into the pocket 30 of the fuselage 16, when the retraction assembly 44 is activated via the trigger assembly 58. Generally, the predetermined location may be spaced away from the cockpit 18, the cabin of the fuselage 16, fuel tank(s), and/or fuel lines, conduits, wiring, etc.

Generally, the maximum stroke position of the piston 38 of the energy absorber 32 is beyond the normal-operation stroke positions of the piston 38 of the energy absorber 32. That is, the maximum stroke position occurs when the threshold is reached. For example, when the force of the land-contact assembly 34 contacting the ground 15 causes the maximum stroke position to be reached, then the threshold is reached, which may activate the trigger assembly 58 to cause the actuator 50 of the retraction assembly 44 to actuate to the unlocked position. Therefore, during landing of the aircraft 12 when the land-contact assembly 34 is in the extended position, if the maximum stroke position is reached, the retraction assembly 44 may be ultimately activated to retract the land-contact assembly 34 to the retracted position in the controlled manner as the aircraft 12 is landing; and this may cause the fuselage 16 of the aircraft 12 to contact the ground 15 during landing due to the land-contact assembly 34 retracting into the pocket 30 of the fuselage 16 in the desired manner. When the land-contact assembly 34 retracts during the event, such as the event described immediately above, the retracted position may include when the land-contact assembly 34 retracts partially or fully into the pocket 30, which again, the pocket 30 may be external of the fuselage 16, internal of the fuselage 16, or a combination thereof. For example, following a high energy vertical descent of the aircraft 12 relative to the ground 15, if the landing energy exceeds the load capacity of the land-contact assembly 34 when contacting the ground 15, the maximum stroke position is reached, and one or more other conditions or thresholds are met, which causes the trigger assembly 58 to activate the retraction assembly 44.

Continuing with FIGS. 5-11, generally, the trigger assembly 58 is operable between the energy absorber 32 and the actuator 50. For example, the trigger assembly 58 may include a switch 60 that determines whether the maximum stroke position is reached. The switch 60 may be in any suitable configuration, and non-limiting examples of the switch 60 may include mechanical switches, electrical switches, etc., some of which are discussed below.

Continuing with FIGS. 5-11, the trigger assembly 58 may include a sensor 62 that detects a pressure in response to movement of the piston 38 of the energy absorber 32. The pressure may be measured inside of the housing 36 of the energy absorber 32, and therefore, in certain configurations, the sensor 62 may be coupled to the housing 36 of the energy absorber 32. The pressure within the housing 36 changes as the energy absorber 32 operates, and when the energy absorber 32 is fully compressed or bottom outs, the trigger assembly 58 may be activated, and the excess pressure may be expelled or bled out of the housing 36 of the energy absorber 32. The sensor 62 may be mechanical, electrical, pneumatic, or any other suitable configuration.

Continuing with FIGS. 5-11, in certain configurations, the landing gear assembly 10 may include a controller 64 in communication with the actuator 50, the switch 60, and the sensor 62. The controller 64 may be in communication with the switch 60 (depending on the type of switch 60), the sensor 62 and the actuator 50 electronically, wirelessly, hard-wired, or any other suitable way to provide communication therebetween.

When the threshold of the pressure inside of the housing 36 of the energy absorber 32 is reached, the trigger assembly 58 causes the actuator 50 to actuate, or communicates to the controller 64 and the controller 64 signals the actuator 50 to actuate, from the locked position to the unlocked position which causes the land-contact assembly 34 to move from the extended position to the retracted position. The controller 64 may signal the actuator 50 to actuate to the unlocked position in response to the switch 60 determining that the maximum stroke position is reached and in response to the sensor 62 detecting the threshold of the pressure is reached. Therefore, when the threshold of the pressure inside of the housing 36 of the energy absorber 32 is reached, the controller 64 may communicate to the actuator 50 to actuate from the locked position to the unlocked position which causes the land-contact assembly 34 to move from the extended position to the retracted position. The controller 64 may be in communication with other components of the aircraft 12, and non-limiting examples may include vehicle management system 66, other sensors, other switches, other systems, etc. The controller 64 and/or the vehicle management system 66 may compile/detect data from various sensors, various controllers, various components, some of which are discussed herein, to determine whether an event is occurring or about to occur where it is desirable to retract the land-contact assembly 34 via the trigger assembly 58.

The controller 64 includes a processor (P) and a memory (M), with the memory (M) including application-suitable amounts of tangible, non-transitory memory, e.g., read only memory, whether optical, magnetic, flash, or otherwise. The controller 64 also includes application-sufficient amounts of random-access memory, electrically-erasable programmable read-only memory, and the like, as well as a high-speed clock, analog-to-digital and digital-to-analog circuitry, and input/output circuitry and devices, as well as appropriate signal conditioning and buffer circuitry. The controller 64 is programmed to execute instructions embodying methods of activating the landing gear system 14, as well as other functions, some of which are discussed herein, with the controller 64 receiving input signals from various components and, in response, outputting control signals to various components, some of which are discussed herein. It is to be appreciated that the vehicle management system may include a processor (P) and a memory (M) as discussed above for the controller 64.

In certain configurations, referring to FIGS. 5-11, the trigger assembly 58 utilizes electrical components to trigger the actuator 50. In this configuration, the trigger assembly 58 may include a first sensor 68 attached to the energy absorber 32 and is configured to determine whether the maximum stroke position is reached. The first sensor 68 may monitor, sense, and/or determine the position of the piston 38 and/or the rod 40 of the energy absorber 32. In certain configurations, the first sensor 68 may communicate with the controller 64 whether the piston 38 is operating in the normal-operation stroke positions or the maximum stroke position. For example, a load applied slowly to the energy absorber 32 will generally result in the energy absorber 32 operating in the normal-operation stroke positions, and a load applied rapidly may result in the energy absorber 32 fully compressed to the maximum stroke position. In certain configurations, such as FIG. 11, the switch 60 discussed above may include the first sensor 68. Furthermore, the first sensor 68 may be referred to as a position sensor.

Also, in this configuration, the trigger assembly 58 may include a second sensor 70 (see FIGS. 5-10) attached to the energy absorber 32. The second sensor 70 is configured to detect the pressure within the housing 36 of the energy absorber 32 in response to movement of the piston 38 of the energy absorber 32. The pressure changes within the housing 36 depending on the position of the piston 38 relative to the housing 36. The pressure increases as the piston 38 approaches the maximum stroke position. A pressure threshold, such as a maximum amount of the pressure, is reached when the piston 38 reaches the maximum stroke position. The pressure may be expelled out of the housing 36 of the energy absorber 32 when the pressure threshold is reached. The second sensor 70 may communicate to the controller 64 the amount of pressure within the housing 36 of the energy absorber 32. In certain configurations, the sensor 62 discussed above may be referred to as the second sensor 70. Furthermore, the second sensor 70 may be referred to as a pressure sensor.

The controller 64 is in communication with the actuator 50, as well as the first sensor 68 and the second sensor 70 as discussed above. The controller 64 may be in communication with the first sensor 68, the second sensor 70, and the actuator 50 electronically, wirelessly, hard-wired, or any other suitable way to provide communication therebetween. The controller 64 signals the actuator 50 to actuate to the unlocked position in response to the first sensor 68 detecting that the maximum stroke position is reached and in response to the second sensor 70 detecting the threshold of the pressure is reached. For example, following a high energy vertical descent of the aircraft 12 relative to the ground 15, if the landing energy exceeds a load capacity of the energy absorber 32 when the land-contact assembly 34 engages the ground 15, the first sensor 68 detects that the maximum stroke position is reached and the second sensor 70 detects that the pressure threshold is reached, and this data may be communicated to the controller 64, and if the controller 64 determines that the conditions are met, the controller 64 signals the actuator 50 to actuate to the unlocked position and retract the land-contact assembly 34 in the controlled manner and into the predetermined location, such as the pocket 30.

Continuing with the configuration of FIG. 11, the trigger assembly 58 may optionally include a vehicle sensor 72 that detects a velocity of the aircraft 12. For example, the vehicle sensor 72 may detect the velocity of the descent of the aircraft 12 as the aircraft 12 is landing. The vehicle sensor 72 may also detect a descent rate of the aircraft 12 in addition to the velocity of the aircraft 12, or alternatively, detect the descent rate instead of the velocity of the descent of the aircraft 12. In various configurations, the controller 64 is in communication with the actuator 50, the first sensor 68 being the switch 60, and the vehicle sensor 72 being the sensor 62. Optionally, for this configuration, the controller 64 may also be in communication with the second sensor 70; and therefore, the controller 64, in certain configurations, is in communication with the actuator 50 the first sensor 68 being the switch 60, the vehicle sensor 72 being the sensor 62, and the second sensor 70. It is to be appreciated that the configurations of FIGS. 4-10 may optionally include the vehicle sensor 72. Furthermore, the vehicle sensor 72 may also detect altitude of the aircraft 12, in addition to, or instead of, other compiled/detected data, i.e., the velocity of the aircraft 12, the descent rate of the aircraft 12, etc.

Generally, referring back to FIG. 11, the controller 64 signals the actuator 50 to actuate to the unlocked position in response to the first sensor 68 determining that the maximum stroke position is reached and in response to the vehicle sensor 72 detecting a threshold of the velocity is reached, and/or detecting a threshold of the descent rate of the aircraft 12; and in certain configurations, and/or in response to the second sensor 70 reaching the pressure threshold. The controller 64 may be in communication with the first sensor 68, the second sensor 70, the vehicle sensor 72, and the actuator 50 electronically, wirelessly, hard-wired, or any other suitable way to provide communication therebetween. The vehicle sensor 72 may include one or more of a variometer, an inertial measurement unit (IMU), an accelerometer, a gyroscope, etc. The vehicle management system 66 of the aircraft 12 may use one or more available sensors, including the vehicle sensor 72, to determine if the conditions are met to retract the land-contact assembly 34 via the trigger assembly 58.

In other configurations, referring to FIGS. 5-10, the trigger assembly 58 may optionally include a pressure-relief valve 74 operable between the energy absorber 32 and the actuator 50. The pressure relief valve 74 allows pressure to be expelled or bled out of the energy absorber 32 when the pressure threshold is reached. More specifically, the pressure-relief valve 74 allows fluid, such as the liquid or the gas, to be expelled out of the housing 36 of the energy absorber 32 when the pressure threshold is reached. The pressure-relief valve 74 is shown in dash-dot-dot-dash lines in some of the figures for illustrative purposes to signify this valve as an optional feature depending on the desired configuration. The pressure-relief valve 74 may include one or more of a one-way valve, a check valve, a pneumatic valve, or any other suitable valve.

Continuing with the configuration of FIGS. 5-10, the switch 60 in this configuration may be a mechanical switch 60. Therefore, in this configuration, the controller 64 communicating with the switch 60 is optional. The switch 60 has an initial position (see FIGS. 6, 7, and 9) when the piston 38 is in the normal-operation stroke positions and a final position (see FIGS. 8 and 10) when the piston 38 is in the maximum stroke position. Therefore, the switch 60 remains in the initial position as the energy absorber 32 operates to absorb energy when the piston 38 moves in the normal-operation stroke positions. It is to be appreciated that, optionally, the first sensor 68 may be used to monitor, sense, and/or determine the position of the piston 38 and/or the rod 40 of the energy absorber 32 in addition to using the mechanical switch 60.

When the piston 38 reaches the maximum stroke position, the pressure threshold is reached, and the pressure relief valve 74 opens which allows the fluid to be expelled out of the housing 36 to alleviate the pressure within the housing 36. Also, when the piston 38 reaches the maximum stroke position, engagement of the piston 38 with the switch 60 causes the switch 60 to move to the final position to open fluid communication to the actuator 50. The expelled fluid from the energy absorber 32 may ultimately be directed to the actuator 50 to cause the actuator 50 to actuate from the locked position to the unlocked position which causes the land-contact assembly 34 to retract to the retracted position.

The trigger assembly 58 may include flow paths 76, 78, 80 to direct the expelled or bled off fluid from the housing 36 of the energy absorber 32 to the actuator 50. For example, the trigger assembly 58 may include a first flow path 76 from the housing 36 of the energy absorber 32 to the pressure-relief valve 74, a second flow path 78 from the pressure-relief valve 74 to the switch 60, and a third flow path 80 from the switch 60 to the actuator 50. The piston 38 engages the switch 60 when the maximum stroke position is reached, which moves the switch 60 from the initial position to the final position to allow fluid communication between the second flow path 78 and the third flow path 80. More specifically, the piston 38 moves along the first axis 42 toward the switch 60 as the rod 40 travels into the housing 36 toward the distal end 48, and as the piston 38 reaches the maximum stroke position, the piston 38 engages the switch 60 which causes the switch 60 to move to the final position. In certain configurations, the switch 60 may move relative to the first axis 42 to the final position. Once the switch 60 is in the final position, the third flow path 80 opens and the fluid from the pressure relief valve 74 is directed out to the actuator 50. For illustrative purposes, FIG. 5 includes arrows A to illustrate fluid flow from the energy absorber 32 to the actuator 50 when the conditions are met to actuate the actuator 50 to the unlocked position. Also, for illustrative purposes, FIG. 7 includes arrows A to illustrate fluid flow from the energy absorber 32 through the pressure-relief valve 74 while the piston 38 is moving in direction of arrow D and still in the normal-operation stroke position. The flow paths 76, 78, 80 may be any suitable configuration, and non-limiting examples may include one or more of tubes, pipes, ducts, conduits, passages, etc.

As mentioned above, the switch 60 of configurations FIGS. 5-10, is a mechanical switch 60, and the features/operation of this switch 60 are discussed next. The switch 60 may include a plunger 82 and a plug 84 adjacent to the plunger 82. The plunger 82 is normally spaced from the plug 84 and the plug 84 is normally blocking fluid communication to the actuator 50. The plunger 82 is movable, in certain situations, which causes movement of the plug 84, in certain situations. Therefore, in this configuration, the plunger 82 is normally in the initial position; that is, when the piston 38 is movable in the normal-operation positions, the plunger 82 remains in the initial position, and thus, the third flow path 80 remains closed due to the plug 84 blocking fluid communication to the third flow path 80 until certain conditions are met. Said differently, the plunger 82 is originally disposed in the initial position and remains in this position until the piston 38 reaches the maximum stroke position. The plunger 82 is movable to the final position when the maximum stroke position of the energy absorber 32 is reached. Specifically, when the piston 38 reaches the maximum stroke position, the piston 38 engages the plunger 82 to move the plunger 82 to the final position. Once the plunger 82 is in the final position, the plunger 82 engages the plug 84 to move the plug 84 outwardly to open the third flow path 80. The plunger 82 and the plug 84 cooperate to present the mechanical switch 60. Therefore, the controller 64 is not needed to signal movement of the plunger 82/the plug 84 in this configuration, and thus, the controller 64 may be optionally in communication with the plunger 82 and the plug 84.

Figure 6:
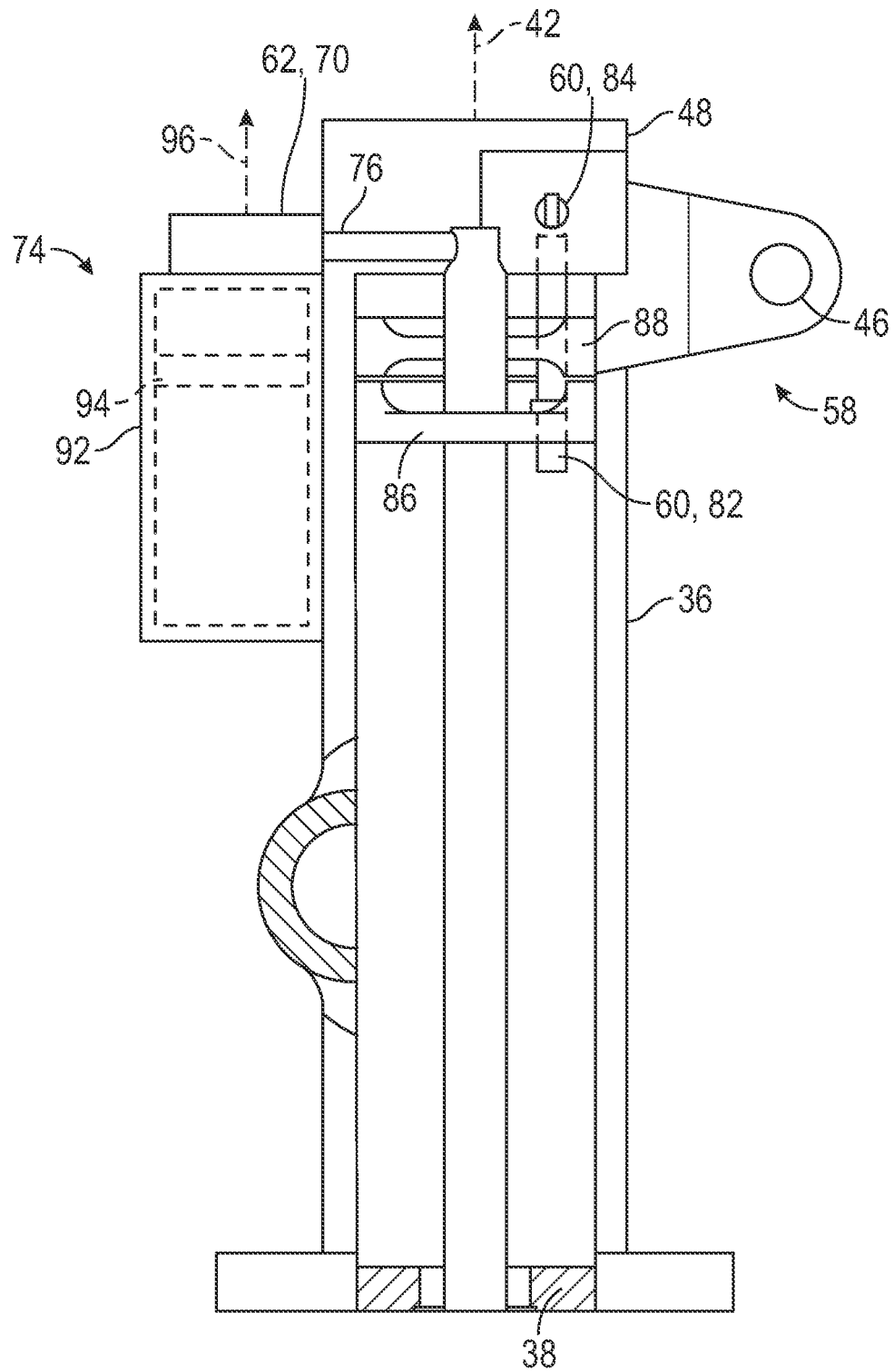
FIG. 6 is a schematic illustration of a piston of the energy absorber in a normal-operation stroke position, and a switch in an initial position.

The plunger 82 and the plug 84 may be disposed inside of the housing 36 of the energy absorber 32. As best shown in FIG. 6, the trigger assembly 58 may include a stop 86 to limit movement of the plunger 82. Specifically, the plunger 82 engages the stop 86 when in the initial position, and the stop 86 prevents the plunger 82 from dropping farther into the housing 36 than desired. The stop 86 may be fixed to the inside of the housing 36 of the energy absorber 32 such that the stop 86 may support the plunger 82 in the initial position.

Optionally, the energy absorber 32 may also include a second stage piston 88 disposed between the stop 86 and the distal end 48 of the energy absorber 32. The second stage piston 88 may improve efficiency of the energy absorber 32. The second stage piston 88 may have a higher-pressure gas chamber than the piston 38.

Figure 10:
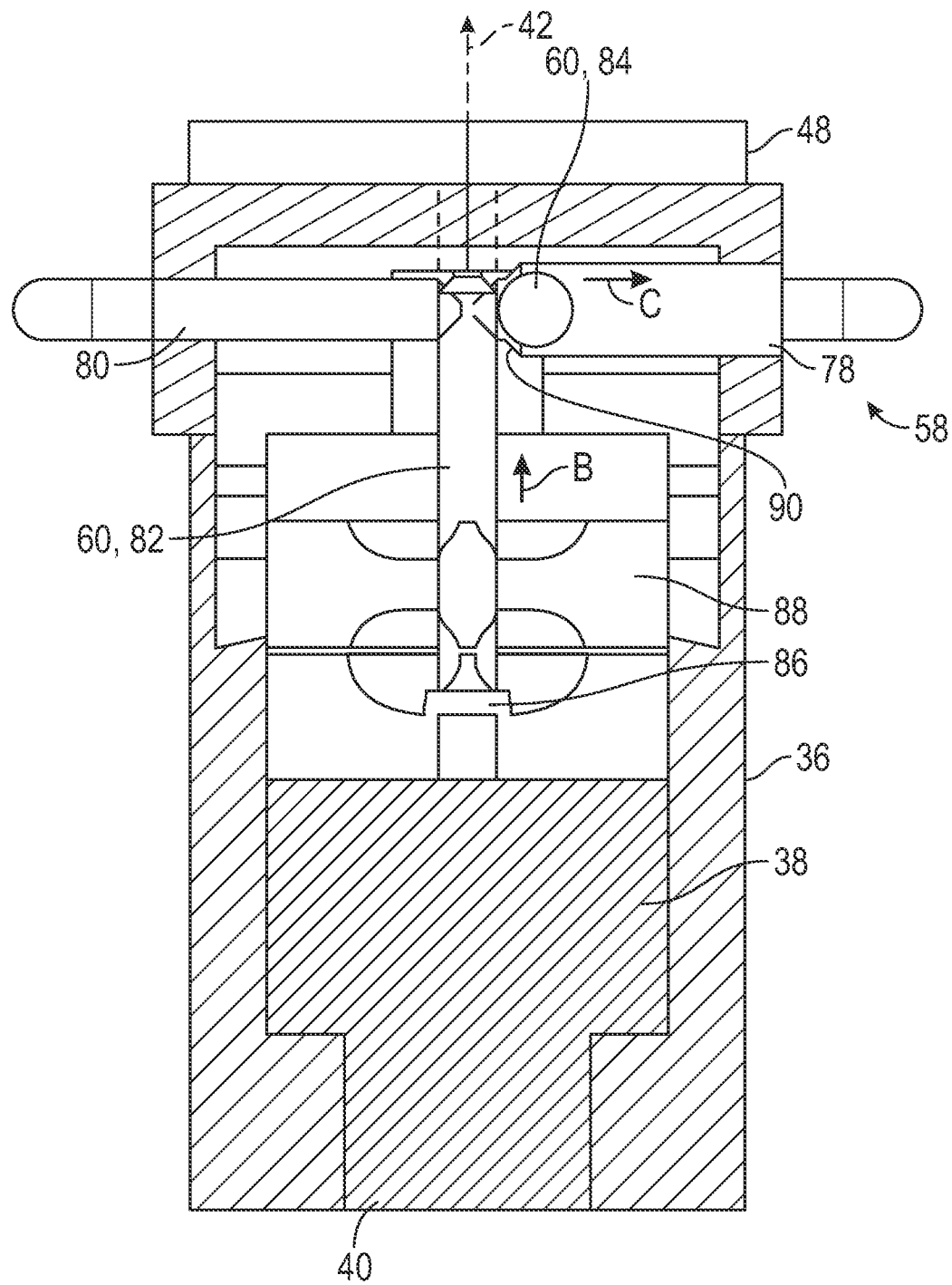
FIG. 10 is a schematic enlarged illustration of the switch of FIG. 9, with the piston engaging the plunger in the maximum stroke position, and the plunger is in the final position, with the plug unseated from the seat.

Turning back to the plug 84, the plug 84 is normally in a closed position (see FIGS. 5-7 and 9) to block fluid communication between the second flow path 78 and the third flow path 80. Pressurized fluid may apply a force to the plug 84 via one of the flow paths, such as the second flow path 78, to continuously bias the plug 84 in the closed position. Therefore, the plug 84 may rest in a seat 90 adjacent to the plunger 82 to normally close fluid communication to the third flow path 80, and thus, close fluid communication to the actuator 50. The plug 84 moves in a different direction from the plunger 82 as best shown in FIG. 10. For example, the plug 84 may move transverse to the plunger 82 relative to the first axis 42.

That is, when the energy absorber 32 operates in the normal-operation stroke positions, the plug 84 is in the closed position. More specifically, when the piston 38 is movable in the normal-operation positions, the plug 84 remains in the closed position, and thus, the third flow path 80 remains closed until certain conditions are met. During normal operation of the aircraft 12, the energy absorber 32 operates in the normal-operation stroke positions and the plug 84 remains seated in the seat 90 in the closed position. Said differently, the plug 84 is originally disposed in the closed position to block fluid communication between the second flow path 78 and the third flow path 80, and remains in this position until certain conditions are met.

Figure 8:
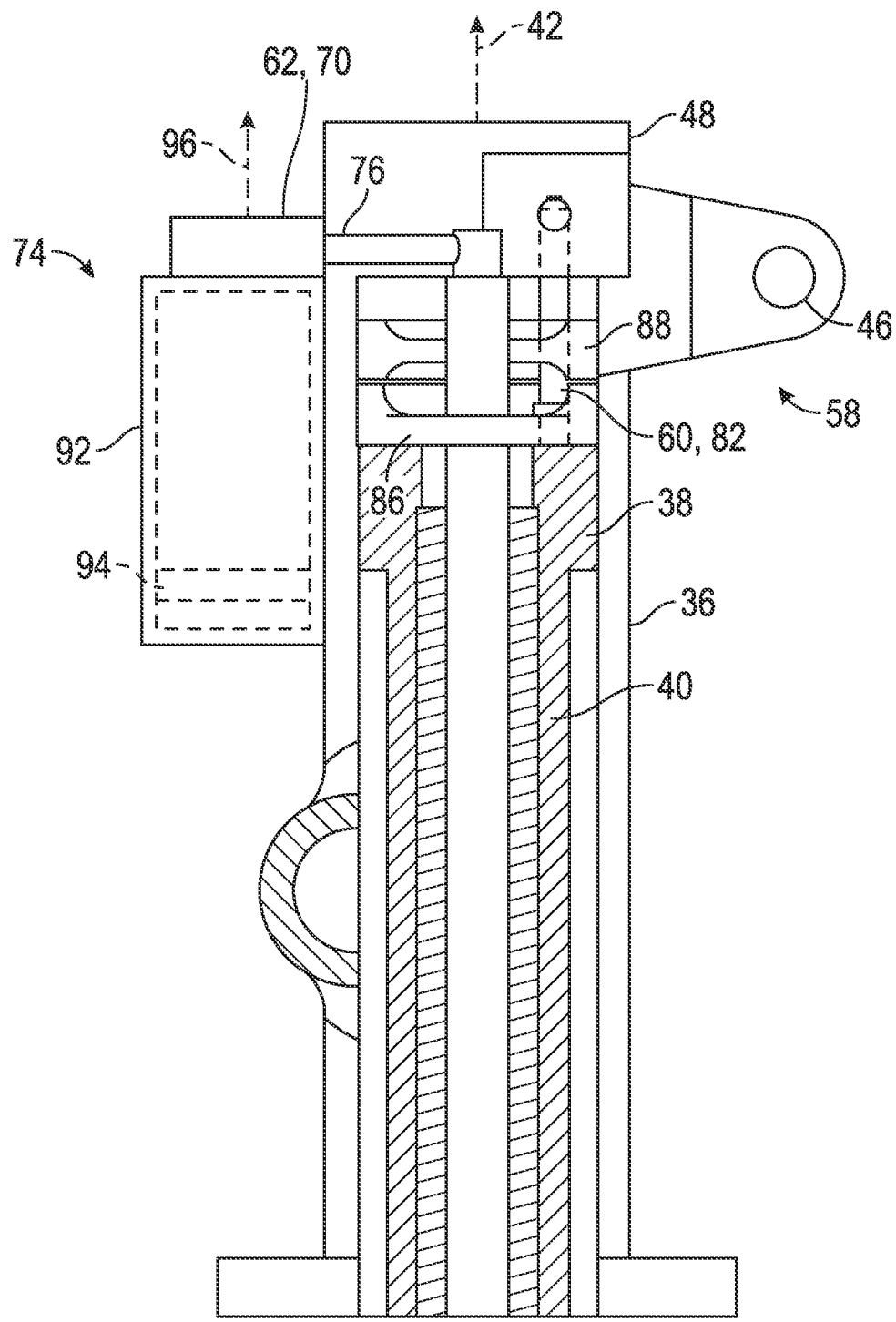
FIG. 8 is a schematic illustration of the piston of FIGS. 6 and 7 in a maximum stroke position, and the switch of FIGS. 6 and 7 in a final position.
Figure 9:
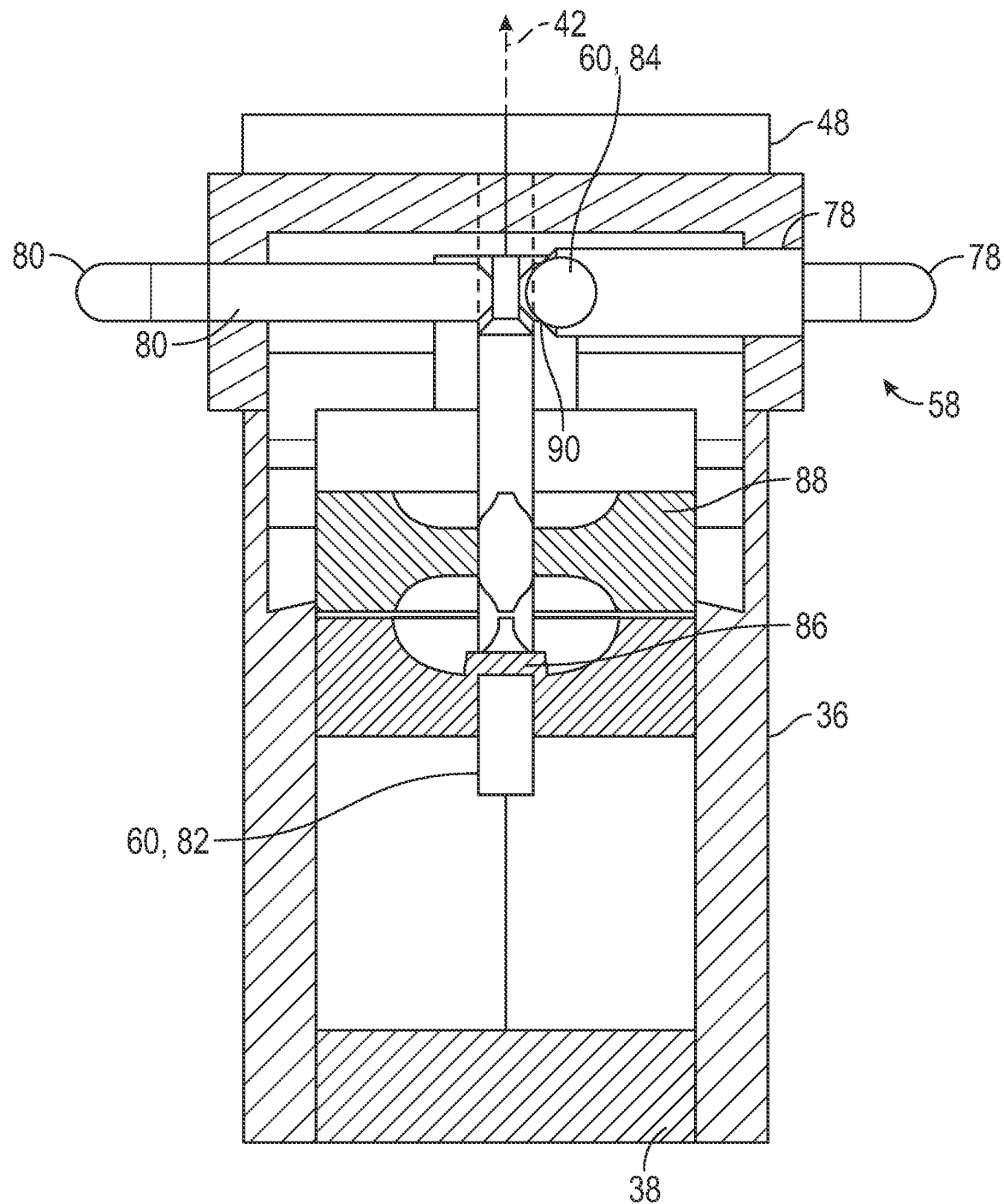
FIG. 9 is a schematic enlarged illustration of the switch including a plunger in the initial position and a plug seated against the seat.

When certain conditions are met, the plug 84 is movable from the closed position to an open position (see FIGS. 8 and 10). The plug 84 is disposed in the open position when the plunger 82 is disposed in the final position to allow fluid communication between the second flow path 78 and the third flow path 80. Therefore, depending on the position of the plunger 82, the plug 84 is either in the closed position or the open position. More specifically, the plunger 82 engages the plug 84 when the plunger 82 is in the final position which moves the plug 84 to the open position to allow fluid communication between the second flow path 78 and the third flow path 80. For example, as best shown in FIG. 10, the plunger 82 moves along the first axis 42 toward the distal end 48 of the energy absorber 32 (arrow B) which causes the plunger 82 to engage the plug 84 and move the plug 84 (arrow C) transverse to the first axis 42 to unseat the plug 84 from the seat 90, which allows fluid communication to the actuator 50, and this fluid communication may actuate the actuator 50 to the unlocked position.

Figure 4:
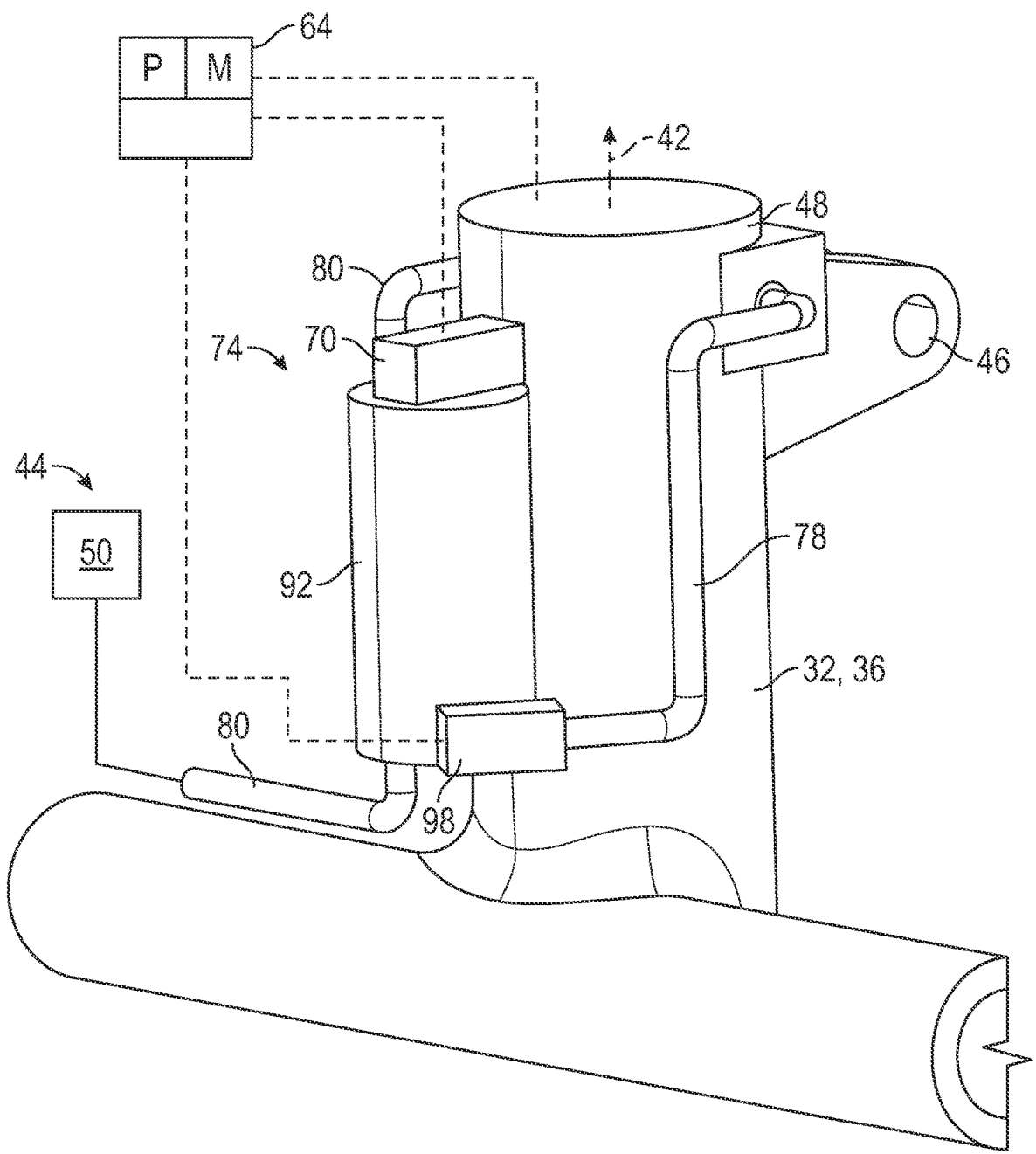
FIG. 4 is a schematic perspective view of one configuration of a trigger assembly coupled to an energy absorber.
Figure 5:
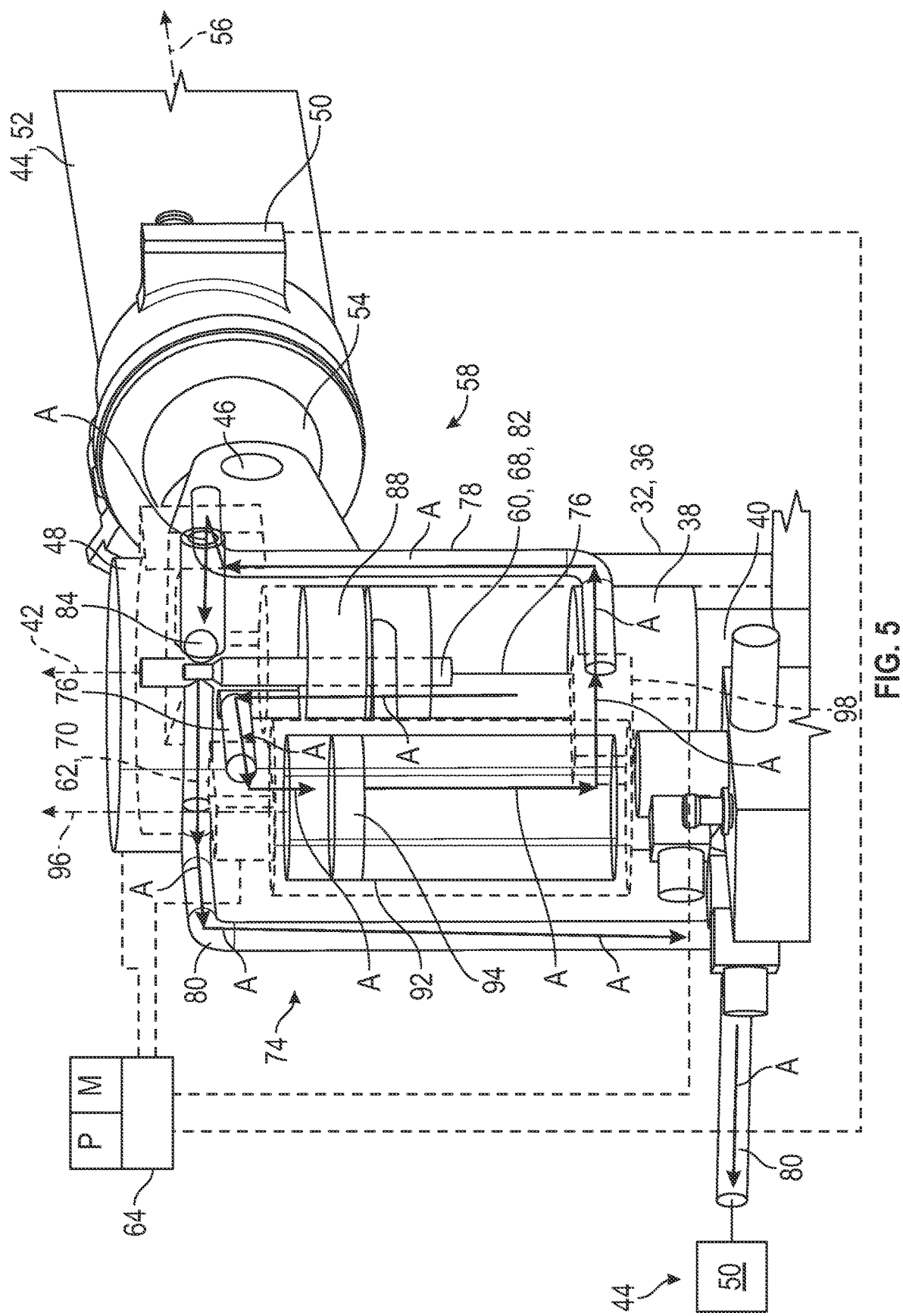
FIG. 5 is a schematic illustration of the internal components of the energy absorber and the trigger assembly of FIG. 4, with some of the components shown in hidden lines (evenly spaced dashes) to illustrate other internal components.

As best shown in FIG. 5, the pressure-relief valve 74 may optionally include a cylinder housing 92 and a floating piston 94 disposed inside of the cylinder housing 92. The cylinder housing 92 may be fixed to the housing 36 of the energy absorber 32, as best shown in FIG. 4. The floating piston 94 is movable depending on the amount of pressure applied thereto from the fluid expelled from the energy absorber 32 (compare FIGS. 6-8). The floating piston 94 may be movable along a third axis 96; and in certain configurations, the third axis 96 is substantially parallel to the first axis 42.

The flow paths 76, 78, 80 may lead into and out of the housing 36 of the energy absorber 32. For example, the first flow path 76 may provide fluid communication between the housing 36 of the energy absorber 32 and the cylinder housing 92 of the pressure-relief valve 74, the second flow path 78 may provide fluid communication between the cylinder housing 92 and the plug 84 within the housing 36 of the energy absorber 32, and the third flow path 80 may provide fluid communication between the plug 84 within the housing 36 of the energy absorber 32 and the actuator 50.

It is to be appreciated that the cylinder housing 92 may be eliminated in certain configurations, and thus the first flow path 76 may be from the housing 36 of the energy absorber 32 to the plug 84 within the housing 36, and the second flow path 78 may be from the plug 84 within the housing 36 to the actuator 50.

Also, optionally, if using an electrical switch 60, instead of the above described mechanical switch 60, the first flow path 76 may be from the housing 36 of the energy absorber 32 to the switch 60, and the second flow path 78 may be from the switch 60 to the actuator 50; and the controller 64 may signal the switch 60 to open to provide fluid communication from the energy absorber 32 to the actuator 50, and this fluid communication may actuate the actuator 50 to the unlocked position.

The present disclosure also provides the methods 200 of activating the landing gear system 14 of the aircraft 12. The methods 200 provide a way to retract the land-contact assembly 34 in the controlled manner following a high energy landing of the aircraft 12 when certain conditions are met.

The methods 200 may begin as the aircraft 12 is descending to land on the ground 15. Generally, during descent of the aircraft 12, the land-contact assembly 34 is positioned in the extended position. The actuator 50 of the retraction assembly 44 is actuated to the locked position which locks the energy absorber 32 and the land-contact assembly 34 in the extended position. The controller 64 may confirm that the land-contact assembly 34 is in the extended position during descent.

Generally, a position of the piston 38 of the energy absorber 32 is detected within the housing 36 of the energy absorber 32. The piston 38 is movable along the first axis 42 in the plurality of normal-operation stroke positions, and is movable to the maximum stroke position as discussed above. As also discussed above, the maximum stroke position of the piston 38 is beyond the normal-operation stroke positions of the piston 38. Therefore, the position of the piston 38 being detected may include the normal-operation stroke positions and/or the maximum stroke position.

As also discussed above, the land-contact assembly 34 is attached to the energy absorber 32. Therefore, the land-contact assembly 34 and the energy absorber 32 are movable together. During landing of the aircraft 12, the energy absorber 32 may absorb energy to reduce disturbances felt in the fuselage 16. The energy absorber 32 may compress and decompress along the first axis 42 to absorb energy when contacting the ground 15.

As also discussed above, the retraction assembly 44 is attached to the energy absorber 32 via the pivot point 46, and the trigger assembly 58 is coupled to the energy absorber 32 and the retraction assembly 44. The trigger assembly 58 is activated in response to the piston 38 of the energy absorber 32 reaching the maximum stroke position to trigger the actuator 50 to actuate from the locked position to the unlocked position to release the retraction assembly 44 in the controlled manner which rotates the energy absorber 32 and the land-contact assembly 34 relative to the pivot point 46 to the retracted position. The trigger assembly 58 may be activated based on various data and/or conditions being met during landing of the aircraft 12, some examples of the data/conditions are discussed next.

Figure 12:
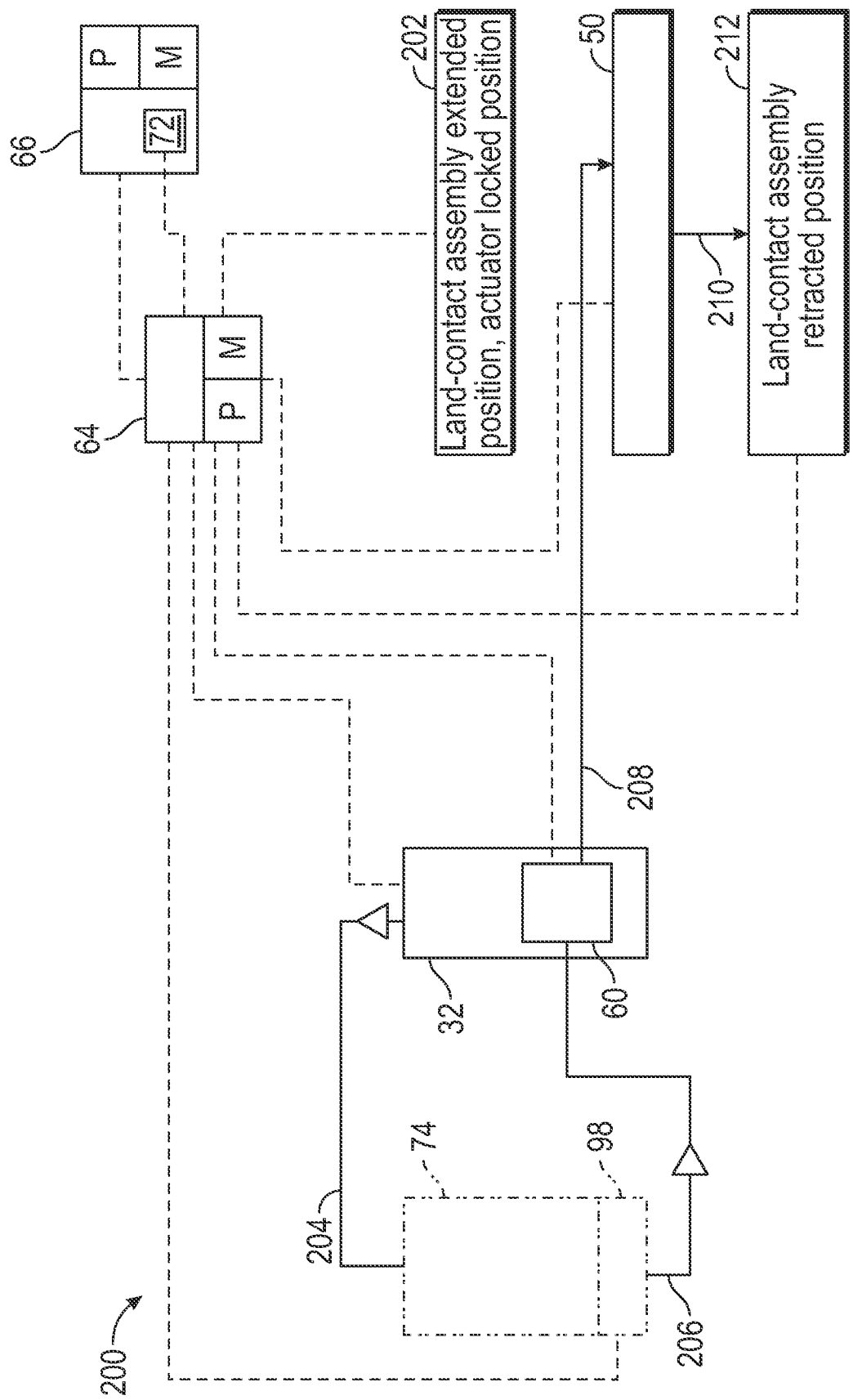
FIG. 12 is a schematic flowchart of a method to ultimately retract the land-contact assembly.

For example, referring to FIG. 12, the controller 64 may confirm that the land-contact assembly 34 is in the extended position during descent of the aircraft 12 and may confirm that the actuator 50 is in the locked position during descent of the aircraft 12 at step 202. When the piston 38 of the energy absorber 32 reaches the maximum stroke position during landing of the aircraft 12, the threshold of the pressure, i.e., the pressure threshold, is reached at step 204. Reaching the threshold of the pressure may be communicated to the controller 64, the position of the switch 60 may be communicated to the controller 64, and/or the excess pressure may be expelled to the cylinder housing 92 of the pressure-relief valve 74. If utilizing the pressure-relief valve 74, a third sensor 98 may detect that the threshold of the pressure within the pressure-relief valve 74 is reached at step 206, and this data may be communicated to the controller 64. If the threshold of the pressure within the pressure-relief valve 74 is below the threshold, then fluid flow is prevented to the actuator 50 and the actuator 50 will remain in the locked position.

The switch 60 may change from the initial position to the final position in response to the maximum stroke position being reached and/or reaching the threshold of the pressure within the pressure-relief valve 74 at step 208. When the conditions are met, then the actuator 50 is activated from the locked position to the unlocked position at step 210, which correspondingly allows the land-contact assembly 34 to move from the extended position to the retracted position in the controlled manner via the retraction assembly 44 at step 212.

Figure 13:
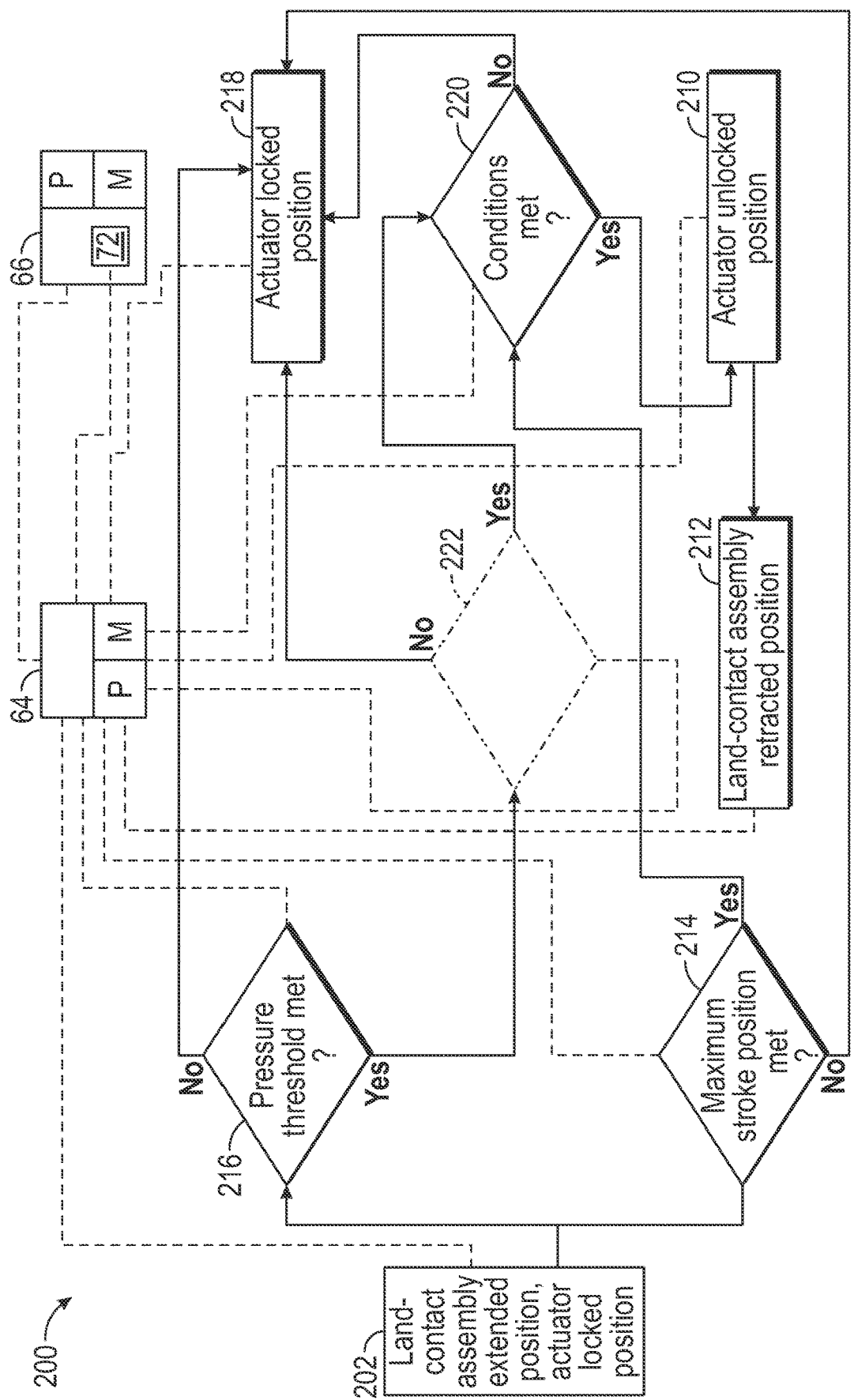
FIG. 13 is another schematic flowchart of a method to ultimately retract the land-contact assembly.

As another example, referring to FIG. 13, the position of the land-contact assembly 34 is communicated to the controller 64. The controller 64 may confirm that the land-contact assembly 34 is in the extended position during descent of the aircraft 12 and may confirm that the actuator 50 is in the locked position during descent of the aircraft 12 at step 202.

As the aircraft 12 descends and when the land-contact assembly 34 engages the ground 15 during landing, various information may be collected, analyzed, used, etc., to determine whether the land-contact assembly 34 should be retracted during landing of the aircraft 12. For example, data such as the position of the piston 38 of the energy absorber 32 at step 214 and the pressure within the energy absorber 32 at step 216 may be used.

If the piston 38 remains in the normal-operation stroke positions, then the actuator 50 remains in the locked position at step 218. If the piston 38 reaches the maximum stroke position, then additional information is analyzed or used at step 220, such as the position of the switch 60, the velocity of the aircraft 12, the descent rate of the aircraft 12, and/or the pressure within the cylinder housing 92 of the pressure-relief valve 74, to determine whether to unlock the actuator 50.

If the pressure within the energy absorber 32 remains below the threshold, then the actuator 50 remains in the locked position at step 218. If the threshold of the pressure within the energy absorber 32 is reached, the additional information is analyzed or used at step 220 and/or step 222, such as the position of the switch 60, the velocity of the aircraft 12, the descent rate of the aircraft 12, and/or the pressure within the cylinder housing 92 of the pressure-relief valve 74, to determine whether to unlock the actuator 50.

If the pressure within the cylinder housing 92 of the pressure-relief valve 74 is below the threshold, then the actuator 50 remains in the locked position at step 218. If the threshold of the pressure within the cylinder housing 92 of the pressure-relief valve 74 is reached, then additional information is analyzed or used at step 220, such as the position of the switch 60, the velocity of the aircraft 12, the descent rate of the aircraft 12, and/or the position of the piston 38 of the energy absorber 32, to determine whether to unlock the actuator 50.

At step 220, if the conditions are met, then the actuator 50 actuates to the unlocked position at step 210, which correspondingly allows the land-contact assembly 34 to move from the extended position to the retracted position in the controlled manner via the retraction assembly 44 at step 212.

Therefore, in certain embodiments, if the pressure-relief valve 74 is eliminated, the following data may be used to determine whether to unlock the actuator 50, which are: A) the position of the piston 38, B) the pressure within the energy absorber 32, C) the position of the switch 60, or any combination of two or more of data A)-C).

In other configurations, if the pressure-relief valve 74 is eliminated, the following data may be used to determine whether to unlock the actuator 50, which are: A) the position of the piston 38, B) the pressure within the energy absorber 32, C) the velocity of the aircraft 12, D) the descent rate of the aircraft 12, or any combination of two or more of data A)-D).

In yet other configurations, if using the pressure-relief valve 74, the following data may be used to determine whether to unlock the actuator 50, which are: A) the position of the piston 38, B) the pressure within the energy absorber 32, C) the pressure within the cylinder housing 92 of the pressure-relief valve 74, D) the position of the switch 60, or any combination of two or more of data A)-D).

It is to be appreciated that having more than one condition/data being used to trigger the actuator 50 provides a back-up or redundancy to prevent the land-contact assembly 34 from moving to the retracted position at an undesired time. For example, if the energy absorber 32 has a leak that caused the energy absorber 32 to fully stroke prematurely, then having another condition that needs to be met as well prevents the land-contact assembly 34 from moving to the retracted position at an undesired time.

Events that may cause the implementation of the methods 200 may include a high energy vertical descent of the aircraft 12 relative to the ground 15, if the landing energy exceeds a load capacity of the landing gear when contacting the ground 15; or a high load application rate to the land-contact assembly 34 due to vertical energy of the aircraft 12 exceeding a threshold of the landing gear during landing.

It is to be appreciated that the order or sequence of performing the methods 200 as described herein is for illustrative purposes and other orders or sequences are within the scope of the present teachings. Furthermore, it is to also be appreciated that the methods 200 may include other features not specifically described in the paragraphs immediately above.

The following Clauses provide some example configurations of the landing gear assembly, the landing gear system, and the method as disclosed herein.

Clause 1: A landing gear assembly for an aircraft, the landing gear assembly comprising: an energy absorber including a housing and a piston movable within the housing along a first axis in a plurality of normal-operation stroke positions; a land-contact assembly attached to the energy absorber, wherein the energy absorber and the land-contact assembly are movable together from an extended position to a retracted position; a retraction assembly attached to the energy absorber via a pivot point, wherein the retraction assembly includes an actuator movable to a locked position which locks the energy absorber and the land-contact assembly in the extended position, and the actuator is movable to an unlocked position which releases the retraction assembly and rotates the energy absorber and the land-contact assembly relative to the pivot point to the retracted position; and a trigger assembly coupled to the energy absorber and the retraction assembly, wherein the trigger assembly is configured to retract the land-contact assembly from the extended position to the retracted position in response to the piston of the energy absorber reaching a maximum stroke position in which the trigger assembly triggers the actuator to actuate from the locked position to the unlocked position to release the retraction assembly in a controlled manner which rotates the energy absorber and the land-contact assembly relative to the pivot point to the retracted position, and wherein the maximum stroke position of the piston is beyond the normal-operation stroke positions of the piston.

Clause 2: The landing gear assembly of clause 1 wherein the trigger assembly is operable between the energy absorber and the actuator.

Clause 3: The landing gear assembly of any of the preceding clauses wherein the trigger assembly includes a switch that determines whether the maximum stroke position is reached.

Clause 4: The landing gear assembly of clause 3 wherein the trigger assembly includes a sensor that detects a pressure in response to movement of the piston of the energy absorber.

Clause 5: The landing gear assembly of clause 4: further including a controller in communication with the actuator, the switch, and the sensor; and wherein the controller signals the actuator to actuate to the unlocked position in response to the switch determining that the maximum stroke position is reached and in response to the sensor detecting a threshold of the pressure is reached.

Clause 6: The landing gear assembly of any of clauses 1-3 wherein the trigger assembly includes a first sensor attached to the energy absorber and is configured to determine whether the maximum stroke position is reached.

Clause 7: The landing gear assembly of clause 6 wherein the trigger assembly includes a second sensor attached to the energy absorber and is configured to detect a pressure within the housing of the energy absorber in response to movement of the piston of the energy absorber.

Clause 8: The landing gear assembly of clause 7: further including a controller in communication with the actuator, the first sensor, and the second sensor; and wherein the controller signals the actuator to actuate to the unlocked position in response to the first sensor detecting that the maximum stroke position is reached and in response to the second sensor detecting a threshold of the pressure is reached.

Clause 9: The landing gear assembly of clauses 1 or 2 wherein the trigger assembly includes a pressure-relief valve operable between the energy absorber and the actuator.

Clause 10: The landing gear assembly of clause 9 wherein the trigger assembly includes a switch having an initial position when the piston is in the normal-operation stroke positions and a final position when the piston is in the maximum stroke position.

Clause 11: The landing gear assembly of clause 10 wherein the trigger assembly includes a first flow path from the housing of the energy absorber to the pressure-relief valve, a second flow path from the pressure-relief valve to the switch, and a third flow path from the switch to the actuator.

Clause 12: The landing gear assembly of clause 11 wherein the piston engages the switch when the maximum stroke position is reached, which moves the switch from the initial position to the final position to allow fluid communication between the second flow path and the third flow path.

Clause 13: The landing gear assembly of clauses 11 or 12 wherein: the switch includes a plunger and a plug adjacent to the plunger; the plug is normally in a closed position to block fluid communication between the second flow path and the third flow path; and the plug is disposed in an open position when the plunger is disposed in the final position to allow fluid communication between the second flow path and the third flow path.

Clause 14: The landing gear assembly of clauses 11 or 12 wherein: the switch includes a plunger and a plug adjacent to the plunger; the plug is normally in a closed position to block fluid communication between the second flow path and the third flow path; and the plunger engages the plug when the plunger is in the final position which moves the plug to an open position to allow fluid communication between the second flow path and the third flow path.

Clause 15: A landing gear system for an aircraft including a fuselage, the landing gear system comprising: a landing gear assembly coupled to the fuselage, the landing gear assembly including: an energy absorber including a housing and a piston movable within the housing along a first axis in a plurality of normal-operation stroke positions; a land-contact assembly attached to the energy absorber, wherein the energy absorber and the land-contact assembly are movable together from an extended position to a retracted position; a retraction assembly attached to the energy absorber via a pivot point and fixed to the fuselage, wherein the retraction assembly includes an actuator movable to a locked position which locks the energy absorber and the land-contact assembly in the extended position, and the actuator is movable to an unlocked position which releases the retraction assembly and rotates the energy absorber and the land-contact assembly relative to the pivot point to the retracted position; and a trigger assembly coupled to the energy absorber and the retraction assembly, wherein the trigger assembly is configured to retract the land-contact assembly from the extended position to the retracted position in response to the piston of the energy absorber reaching a maximum stroke position in which the trigger assembly triggers the actuator to actuate from the locked position to the unlocked position to release the retraction assembly in a controlled manner which rotates the energy absorber and the land-contact assembly relative to the pivot point to the retracted position, and wherein the maximum stroke position of the piston is beyond the normal-operation stroke positions of the piston.

Clause 16: The landing gear system of clause 15 wherein: the retraction assembly includes a housing fixed to the fuselage and a rod movable relative to the housing along a second axis; the actuator is attached to the housing of the retraction assembly and the actuator engages the rod of the retraction assembly in the locked position; the first axis and the second axis are transverse relative to each other when the land-contact assembly is in the extended position; the energy absorber includes a rod attached to the land-contact assembly, and the piston is fixed to the rod opposite the land-contact assembly; the rod and the piston of the energy absorber are movable together along the first axis relative to the housing; and the energy absorber includes a distal end spaced from the land-contact assembly, and the pivot point is disposed along the distal end and the rod of the retraction assembly is attached to the distal end of the energy absorber at the pivot point.

Clause 17: The landing gear system of clauses 15 or 16: wherein the trigger assembly includes a switch that determines whether the maximum stroke position is reached; wherein the trigger assembly includes a sensor that detects a pressure in response to movement of the piston of the energy absorber; further including a controller in communication with the actuator, the switch, and the sensor; and wherein the controller signals the actuator to actuate to the unlocked position in response to the switch determining that the maximum stroke position is reached and in response to the sensor detecting a threshold of the pressure is reached.

Clause 18: The landing gear system of clauses 15 or 16: wherein the trigger assembly includes a switch that determines whether the maximum stroke position is reached; wherein the trigger assembly includes a sensor that detects a pressure in response to movement of the piston of the energy absorber; further including a controller in communication with the actuator, the switch, and the sensor; and wherein the controller signals the actuator to actuate to the unlocked position in response to the switch determining that the maximum stroke position is reached and in response to the sensor detecting a threshold of the pressure is reached.

Clause 19: The landing gear system of clauses 15 or 16: wherein the trigger assembly includes a first sensor attached to the energy absorber and is configured to determine whether the maximum stroke position is reached; wherein the trigger assembly includes a vehicle sensor that detects a velocity of the aircraft; further including a controller in communication with the actuator, the first sensor, and the vehicle sensor; and wherein the controller signals the actuator to actuate to the unlocked position in response to the first sensor determining that the maximum stroke position is reached and in response to the vehicle sensor detecting a threshold of the velocity is reached.

Clause 20: A method of activating a landing gear system of an aircraft, the method comprising: positioning a land-contact assembly in an extended position; detecting a position of a piston of an energy absorber within a housing of the energy absorber, wherein the piston is movable along a first axis in a plurality of normal-operation stroke positions, and the land-contact assembly is attached to the energy absorber; actuating an actuator of a retraction assembly to a locked position which locks the energy absorber and the land-contact assembly in the extended position, wherein the retraction assembly is attached to the energy absorber via a pivot point; and activating a trigger assembly in response to the piston of the energy absorber reaching a maximum stroke position to trigger the actuator to actuate from the locked position to an unlocked position to release the retraction assembly in a controlled manner which rotates the energy absorber and the land-contact assembly relative to the pivot point to a retracted position, and wherein the maximum stroke position of the piston is beyond the normal-operation stroke positions of the piston, and wherein the trigger assembly is coupled to the energy absorber and the retraction assembly.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the configurations described herein are intended to provide a general understanding of the structure of the various embodiments. The illustrations are not intended to serve as a complete description of all of the elements and features of apparatus and systems that utilize the structures or methods described herein. Many other embodiments or configurations may be apparent to those of skill in the art upon reviewing the disclosure. Other embodiments or configurations may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A landing gear assembly for an aircraft, the landing gear assembly comprising:
    an energy absorber including a housing and a piston movable within the housing along a first axis in a plurality of normal-operation stroke positions;
    a land-contact assembly attached to the energy absorber, wherein the energy absorber and the land-contact assembly are movable together from an extended position to a retracted position;
    a retraction assembly attached to the energy absorber via a pivot point, wherein the retraction assembly includes an actuator movable to a locked position which locks the energy absorber and the land-contact assembly in the extended position, and the actuator is movable to an unlocked position which releases the retraction assembly and rotates the energy absorber and the land-contact assembly relative to the pivot point to the retracted position;
    a trigger assembly coupled to the energy absorber and the retraction assembly, wherein the trigger assembly is configured to retract the land-contact assembly from the extended position to the retracted position in response to the piston of the energy absorber reaching a maximum stroke position in which the trigger assembly triggers the actuator to actuate from the locked position to the unlocked position to release the retraction assembly in a controlled manner which rotates the energy absorber and the land-contact assembly relative to the pivot point to the retracted position, and wherein the maximum stroke position of the piston is beyond the normal-operation stroke positions of the piston; and
    wherein the trigger assembly includes a switch incorporated into the housing of the energy absorber and configured to determine whether the maximum stroke position is reached, and wherein the switch provides active control of the trigger assembly.

2. The landing gear assembly of claim 1 wherein the trigger assembly is operable between the energy absorber and the actuator.

3. The landing gear assembly of claim 1 wherein the trigger assembly includes a sensor incorporated into the energy absorber, and the sensor is configured to detect a pressure in response to movement of the piston of the energy absorber.

4. The landing gear assembly of claim 3:
    further including a controller in communication with the actuator, the switch, and the sensor; and
    wherein the controller signals the actuator to actuate to the unlocked position in response to the switch determining that the maximum stroke position is reached and in response to the sensor detecting a threshold of the pressure is reached.

5. The landing gear assembly of claim 1 wherein the trigger assembly includes a first sensor attached to the energy absorber and is configured to determine whether the maximum stroke position is reached.

6. The landing gear assembly of claim 5 wherein the trigger assembly includes a second sensor attached to the energy absorber and is configured to detect a pressure within the housing of the energy absorber in response to movement of the piston of the energy absorber.

7. The landing gear assembly of claim 6:
further including a controller in communication with the actuator, the first sensor, and the second sensor; and
wherein the controller signals the actuator to actuate to the unlocked position in response to the first sensor detecting that the maximum stroke position is reached and in response to the second sensor detecting a threshold of the pressure is reached.

8. The landing gear assembly of claim 1 wherein the trigger assembly includes a pressure-relief valve operable between the energy absorber and the actuator.

9. The landing gear assembly of claim 8 wherein the switch has an initial position when the piston is in the normal-operation stroke positions and a final position when the piston is in the maximum stroke position.

10. The landing gear assembly of claim 9 wherein the trigger assembly includes a first flow path from the housing of the energy absorber to the pressure-relief valve, a second flow path from the pressure-relief valve to the switch, and a third flow path from the switch to the actuator.

11. The landing gear assembly of claim 10 wherein the piston engages the switch when the maximum stroke position is reached, which moves the switch from the initial position to the final position to allow fluid communication between the second flow path and the third flow path.

12. The landing gear assembly of claim 11 wherein:
the switch includes a plunger and a plug adjacent to the plunger;
the plug is normally in a closed position to block fluid communication between the second flow path and the third flow path; and
the plug is disposed in an open position when the plunger is disposed in the final position to allow fluid communication between the second flow path and the third flow path.

13. The landing gear assembly of claim 11 wherein:
the switch includes a plunger and a plug adjacent to the plunger;
the plug is normally in a closed position to block fluid communication between the second flow path and the third flow path; and
the plunger engages the plug when the plunger is in the final position which moves the plug to an open position to allow fluid communication between the second flow path and the third flow path.

14. A landing gear system for an aircraft including a fuselage, the landing gear system comprising:
a landing gear assembly coupled to the fuselage, the landing gear assembly including:
an energy absorber including a housing and a piston movable within the housing along a first axis in a plurality of normal-operation stroke positions;
a land-contact assembly attached to the energy absorber, wherein the energy absorber and the land-contact assembly are movable together from an extended position to a retracted position;
a retraction assembly attached to the energy absorber via a pivot point and fixed to the fuselage, wherein the retraction assembly includes an actuator movable to a locked position which locks the energy absorber and the land-contact assembly in the extended position, and the actuator is movable to an unlocked position which releases the retraction assembly and rotates the energy absorber and the land-contact assembly relative to the pivot point to the retracted position;
a trigger assembly coupled to the energy absorber and the retraction assembly, wherein the trigger assembly is configured to retract the land-contact assembly from the extended position to the retracted position in response to the piston of the energy absorber reaching a maximum stroke position in which the trigger assembly triggers the actuator to actuate from the locked position to the unlocked position to release the retraction assembly in a controlled manner which rotates the energy absorber and the land-contact assembly relative to the pivot point to the retracted position, and wherein the maximum stroke position of the piston is beyond the normal-operation stroke positions of the piston; and
wherein the trigger assembly includes a switch incorporated into the housing of the energy absorber and the switch provides active control of the trigger assembly.

15. The landing gear system of claim 14 wherein:
the retraction assembly includes a housing fixed to the fuselage and a rod movable relative to the housing of the retraction assembly along a second axis;
the actuator is attached to the housing of the retraction assembly and the actuator engages the rod of the retraction assembly in the locked position;
the first axis and the second axis are transverse relative to each other when the land-contact assembly is in the extended position;
the energy absorber includes a rod attached to the land-contact assembly, and the piston is fixed to the rod of the energy absorber opposite the land-contact assembly;
the rod and the piston of the energy absorber are movable together along the first axis relative to the housing of the energy absorber; and
the energy absorber includes a distal end spaced from the land-contact assembly, and the pivot point is disposed along the distal end and the rod of the retraction assembly is attached to the distal end of the energy absorber at the pivot point.

16. The landing gear system of claim 15:
wherein the switch is configured to determine whether the maximum stroke position is reached;
wherein the trigger assembly includes a sensor that detects a pressure in response to movement of the piston of the energy absorber;
further including a controller in communication with the actuator, the switch, and the sensor; and
wherein the controller signals the actuator to actuate to the unlocked position in response to the switch determining that the maximum stroke position is reached and in response to the sensor detecting a threshold of the pressure is reached.

17. The landing gear system of claim 14:
wherein the switch is configured to determine whether the maximum stroke position is reached;
wherein the trigger assembly includes a sensor that detects a pressure in response to movement of the piston of the energy absorber;
further including a controller in communication with the actuator, the switch, and the sensor; and
wherein the controller signals the actuator to actuate to the unlocked position in response to the switch determining that the maximum stroke position is reached and in response to the sensor detecting a threshold of the pressure is reached.

18. The landing gear system of claim 14:
wherein the trigger assembly includes a first sensor attached to the energy absorber and is configured to determine whether the maximum stroke position is reached;
wherein the trigger assembly includes a vehicle sensor that detects a velocity of the aircraft;
further including a controller in communication with the actuator, the first sensor, and the vehicle sensor; and
wherein the controller signals the actuator to actuate to the unlocked position in response to the first sensor determining that the maximum stroke position is reached and in response to the vehicle sensor detecting a threshold of the velocity is reached.

19. A method of activating a landing gear system of an aircraft, the method comprising:
positioning a land-contact assembly in an extended position;
detecting a position of a piston of an energy absorber within a housing of the energy absorber, wherein the piston is movable along a first axis in a plurality of normal-operation stroke positions, and the land-contact assembly is attached to the energy absorber;
actuating an actuator of a retraction assembly to a locked position which locks the energy absorber and the land-contact assembly in the extended position, wherein the retraction assembly is attached to the energy absorber via a pivot point;
activating a trigger assembly in response to the piston of the energy absorber reaching a maximum stroke position to trigger the actuator to actuate from the locked position to an unlocked position to release the retraction assembly in a controlled manner which rotates the energy absorber and the land-contact assembly relative to the pivot point to a retracted position, and wherein the maximum stroke position of the piston is beyond the normal-operation stroke positions of the piston, and wherein the trigger assembly is coupled to the energy absorber and the retraction assembly; and
determining whether the maximum stroke position is reached via a switch that provides active control of the trigger assembly.

20. The landing gear assembly of claim 1 wherein the trigger assembly includes a pressure-relief valve attached to the housing of the energy absorber such that the energy absorber and the pressure-relief valve are movable together from the extended position to the retracted position independently of the retraction assembly.

* * * * *